United States Patent [19]

Thakker et al.

[11] Patent Number: 6,080,818

[45] Date of Patent: Jun. 27, 2000

[54] POLYOLEFIN BLENDS USED FOR NON-WOVEN APPLICATIONS

[75] Inventors: Mahendra T. Thakker; Jesus F. Galindo; Dharmendra Jani, all of Odessa, Tex.; Andres Sustic, Woodbury, Minn.

[73] Assignee: Huntsman Polymers Corporation, Salt Lake City, Utah

[21] Appl. No.: 09/033,172

[22] Filed: Mar. 2, 1998

Related U.S. Application Data

[63] Continuation-in-part of application No. 08/822,865, Mar. 24, 1997, Pat. No. 5,723,546.
[60] Provisional application No. 60/075,297, Feb. 20, 1998.

[51] Int. Cl.⁷ .................................................. C08L 23/04
[52] U.S. Cl. ............................................................ 525/240
[58] Field of Search .............................................. 525/240

[56] References Cited

U.S. PATENT DOCUMENTS

| | | | |
|---|---|---|---|
| 3,112,300 | 11/1963 | Natta et al. | 260/93.7 |
| 3,112,301 | 11/1963 | Natta et al. | 260/93.7 |
| 3,963,659 | 6/1976 | Binder et al. | 260/28.5 AS |
| 4,022,728 | 5/1977 | Trotter et al. | 260/27 R |
| 4,075,290 | 2/1978 | Denzel et al. | 260/897 A |
| 4,335,225 | 6/1982 | Collette et al. | 525/240 |
| 4,347,158 | 8/1982 | Kaus et al. | 252/429 B |
| 4,525,555 | 6/1985 | Tajima et al. | 526/125 |
| 4,547,476 | 10/1985 | Terano et al. | 502/127 |
| 4,650,830 | 3/1987 | Yonekura et al. | 525/193 |
| 4,713,133 | 12/1987 | Kent | 156/162 |
| 4,736,002 | 4/1988 | Allen et al. | 526/125 |
| 4,829,037 | 5/1989 | Terano et al. | 502/127 |
| 4,839,321 | 6/1989 | Murai et al. | 502/127 |
| 4,847,227 | 7/1989 | Murai et al. | 502/127 |
| 4,950,720 | 8/1990 | Randall, Jr. et al. | 525/322 |
| 4,960,820 | 10/1990 | Hwo | 524/528 |
| 4,970,186 | 11/1990 | Terano et al. | 502/127 |
| 4,990,477 | 2/1991 | Kioka et al. | 502/107 |
| 5,066,737 | 11/1991 | Job | 526/119 |
| 5,077,357 | 12/1991 | Job | 526/119 |
| 5,082,907 | 1/1992 | Job | 526/119 |
| 5,089,573 | 2/1992 | Job | 526/124 |
| 5,106,806 | 4/1992 | Job | 502/111 |
| 5,118,649 | 6/1992 | Job | 502/124 |
| 5,118,767 | 6/1992 | Job | 526/124 |
| 5,118,768 | 6/1992 | Job et al. | 526/124 |
| 5,122,494 | 6/1992 | Job | 502/124 |
| 5,124,298 | 6/1992 | Job | 502/127 |
| 5,130,284 | 7/1992 | Terano et al. | 502/125 |
| 5,153,158 | 10/1992 | Kioka et al. | 502/126 |
| 5,164,352 | 11/1992 | Job et al. | 502/124 |
| 5,182,245 | 1/1993 | Arzoumanidis et al. | 502/115 |
| 5,218,052 | 6/1993 | Cohen et al. | 525/240 |
| 5,264,493 | 11/1993 | Palate et al. | 525/194 |
| 5,269,807 | 12/1993 | Liu | 606/228 |
| 5,294,581 | 3/1994 | Job | 502/124 |
| 5,300,365 | 4/1994 | Ogale | 428/461 |
| 5,317,070 | 5/1994 | Brant et al. | 526/348.5 |
| 5,331,047 | 7/1994 | Giacobbe | 525/88 |
| 5,331,054 | 7/1994 | Fujita et al. | 525/240 |
| 5,358,994 | 10/1994 | Mallow | 524/495 |
| 5,368,927 | 11/1994 | Lesca et al. | 428/288 |
| 5,382,630 | 1/1995 | Stehling et al. | 525/240 |
| 5,382,631 | 1/1995 | Stehling et al. | 525/240 |
| 5,414,063 | 5/1995 | Seeger et al. | 526/88 |
| 5,438,110 | 8/1995 | Ishimaru et al. | 526/125 |
| 5,453,318 | 9/1995 | Giacobbe | 428/286 |
| 5,455,305 | 10/1995 | Galambos | 525/240 |
| 5,468,807 | 11/1995 | Tsurutani et al. | 525/240 |
| 5,476,911 | 12/1995 | Morini et al. | 526/124.6 |
| 5,478,891 | 12/1995 | Lakshmanan et al. | 525/240 |
| 5,512,625 | 4/1996 | Butterbach et al. | 524/490 |
| 5,516,848 | 5/1996 | Canich et al. | 525/240 |
| 5,539,056 | 7/1996 | Yang et al. | 525/240 |
| 5,596,052 | 1/1997 | Resconi et al. | 526/127 |
| 5,681,913 | 10/1997 | Sustic et al. | 526/348 |
| 5,710,219 | 1/1998 | Bates et al. | 525/240 |
| 5,714,256 | 2/1998 | DeLucia et al. | 428/373 |
| 5,719,219 | 2/1998 | Shah et al. | 524/264 |
| 5,723,546 | 3/1998 | Sustic | 525/240 |
| 5,763,333 | 6/1998 | Suzuki et al. | 442/351 |
| 5,948,720 | 9/1999 | Sun et al. | 502/105 |

FOREIGN PATENT DOCUMENTS

| | | |
|---|---|---|
| 0 475 307 | 3/1992 | European Pat. Off. . |
| 586 937 | 3/1994 | European Pat. Off. . |
| 0 658 577 B1 | 6/1995 | European Pat. Off. . |
| 3 334 559 | 4/1984 | Germany . |
| 2 130 225 | 5/1984 | United Kingdom . |
| WO 98/02610 | 1/1998 | WIPO . |
| Wo 98/02609 | 1/1998 | WIPO . |

OTHER PUBLICATIONS

"REXflex® Flexible Polyolefins," Rexene Corporation, Nov., 1996.

L.M. Sherman, "Take A Look At PP Now," Plastics Technology, Jan., 1996, pp. 38–41.

"REXflex™ FPO," Rexene Corporation, 1994.

Business Research Report, "Hot Melt Adhesives B149," p. 1 (1989).

A. Sustic et al., "Novel Amorphous Polyalphaolefins (APAO) in Hot Melt Adhesive Formulations," TAPPI Notes, p. 192–200 (1991).

A. Sustic, et al., "On–Purpose Amorphous Polyalphaolefins Used in Hot Melt Adhesives," *J. Adh. Seal. Council,* 20(2):41 (1991).

Collette, J.W., et al., "Elastomeric Polypropylenes from Alumina–Supported Tetralkyl Group IVB Catalysts," *Macromolecules,* 22:3851–58 (1989).

*Primary Examiner*—Edward J. Cain
*Attorney, Agent, or Firm*—Pennie & Edmonds LLP

[57] ABSTRACT

The invention relates to methods for preparing a fiber, thread or yarn including a polymer blend of a predominantly atactic flexible polyolefin polymer having a high weight average molecular weight of at least about 100,000 and a heat of fusion of about 15 to 60 J/g with an isotactic polypropylene polymer, and forming the polymer blend into a fiber, thread or yarn, wherein the flexible polymer is present in an amount sufficient to increase the elasticity of the fiber, thread or yarn to inhibit substantial breakage thereof, for use in non-woven products. The invention also relates to the fiber, thread or yarn including the polymers, as well as non-woven products prepared therefrom. Moreover, the invention relates to composite articles including the fiber, thread or yarn in combination with adhesive compositions, and polymer blends used for such adhesive compositions.

29 Claims, No Drawings

POLYOLEFIN BLENDS USED FOR NON-WOVEN APPLICATIONS

CROSS-REFERENCE TO RELATED APPLICATIONS

This is a continuation-in-part of application Ser. No. 08/822,865 filed Mar. 24, 1997, now U.S. Pat. No. 5,723,546. This application also claims priority to the provisional Application No. 60/075,297, filed Feb. 20, 1998, entitled "POLYOLEFIN BLENDS FOR NON-WOVEN APPLICATIONS," believed to have the same inventors as this application.

TECHNICAL FIELD

This invention relates to fibers, threads, and yarns made of polymer blends, and methods of using the same, in a variety of non-woven products, such as webs, films, and foams. More particularly, the invention relates to blends of polyalphaolefin polymers including a novel flexible polyolefin component and an isotactic polypropylene component.

BACKGROUND OF THE INVENTION

The use of hot melt adhesives as substitutes, or even replacements, for conventional solvent-based adhesives in various applications has been increasingly favored because of environmental concerns caused by the emission of volatile organic compounds (VOCs), the well-being of workers in the workplace, and faster setting times than solvent-based adhesives.

A variety of hot melt adhesive formulations, polymeric modifiers and other applications include an amorphous polyalphaolefin (APAO). In such formulations, it is important that the polymer exhibit such characteristics as a range of tightly controlled BROOKFIELD® melt viscosities (MVs), needle penetrations (NPs) and ring & ball softening points (RBSPs, or R & B SPs), controllable and predictable long open time (OTs), low temperature flexibility, adhesion to a variety of substrates and compatibility with a variety of tackifiers and waxes. It is desirable to use such raw materials with reproducible specifications to obtain consistent properties in the formulations used in adhesive and other formulations.

It is well known that crystalline polypropylene generally has an isotactic or syndiotactic structure, and that amorphous polymers, such as atactic polypropylene, generally have a considerable atactic structure having low crystallinity. U.S. Pat. Nos. 3,112,300 and 3,112,301, for example, describe isotactic polypropylene and provide structural formulae for isotactic and syndiotactic polypropylene polymers. The former is a straight chain of propylene units wherein the methyl groups are all aligned on one side of the polymer chain. In the latter, the methyl groups alternate from one side of the chain to the other. Atactic polypropylenes, on the other hand, have methyl chains randomly disposed on opposite sides of the polymer chain. In the isotactic and syndiotactic polypropylenes of the patents above, the regularity of structure tends to result in a more highly crystalline material. Atactic polypropylene polymers of low molecular weight typically result in gummy materials having minimal tensile strength. The isotactic or syndiotactic polymers have a variety of disadvantages, such as low elongation capabilities and no open time, due to their high crystallinity, making them undesirable in hot melt adhesive formulations.

Most of the polypropylene which is produced commercially is crystalline isotactic polypropylene. Conventional polymers of this type typically have a crystallinity, or heat of fusion, of 70 J/g or higher, and more typically 90 J/g or higher. These polymers are well known and have been the subject of many patents and articles.

APAO polypropylenes, which have very little strength, are used commercially in adhesives and as asphalt additives, for example. Conventional atactic polypropylenes that tend to have a crystallinity of less than 20 J/g typically have an extremely high melt flow rate of around 2,000 g/10 min. or higher (at 230° C.). Generally, these atactic polypropylene polyolefins are sticky, which limits their possible usage in commercial products. Conventional LMW APAOs have not found much use in certain applications where high tensile and elongation values are required, because these APAOs lack such characteristics.

High-molecular weight ("HMW") APAOs, also called flexible polyolefin polymers or FPO polymers herein, such as amorphous propylene homo- and co-polymers, are important for their use in diverse products. The broad utility of these materials is due in large part to the unique combination of chemical and physical properties, such as chemical inertness, softness, flexibility, etc., exhibited by these materials. Conventional amorphous, or atactic, polypropylene is different from crystalline polypropylenes in steric microstructure, and usually lacks tensile strength, for example. It is also known that the combination of different polymers to obtain polymer blends for particular uses, however, makes conventional blends that tend to have several disadvantages, such as low melt viscosities, immiscibility that imparts optical haziness and two independent melting points (mp) and/or glass transition temperatures ($T_g$), and poor or no open time.

Various references disclose some conventional polymer blends, some of which are discussed below. As used herein, the word "blend" or "blends" includes the mechanical polyblends, mechanochemical polyblends, chemical polyblends, solution-cast polyblends and latex polyblends described in the Kirk-Othmer Concise Encyclopedia of Chemical Technology, Volume 24, $3^{rd}$ ed. Pp 920–922 (Wiley & Sons, N.Y., ISBN 0-471-86977-5), the entry for which is expressly incorporated herein by reference thereto. The word "blend" also includes physical mixtures of at least two polymeric materials.

U.S. Pat. No. 3,963,659 discloses homogeneous thermoplastic bituminous compositions containing up to 25 parts by weight of cross-linkable ethylene-α-olefin rubber, and methods for preparing the sane, to provide improved properties for use in asphalt applications. The cross-linkable rubbers in the bituminous compositions yield high tensile strength final products.

U.S. Pat. No. 4,022,728 discloses hot melt pressure sensitive adhesives made of blends of amorphous polyolefin, a LMW substantially amorphous polymer, a liquid tackifying resin, and crystalline polypropylene to provide good adhesive properties at low temperatures.

U.S. Pat. No. 4,075,290 discloses polymer blends having a major amount of isotactic polybutene-1 having a molecular weight of 500,000 to 1,750,000 with a minor amount of low-pressure ethylene with a polypropylene or butene-1 copolymer having a molecular weight of 200,000 to 350,000, where the blends allegedly exhibit excellent weldability and superior tear and rupture resistance.

U.S. Pat. No. 4,650,830 discloses a thermoplastic elastomer composition allegedly having good injection fusion bondability and surface gloss properties made of an amorphous ethylene/α-olefin copolymer and (i) a low crystallinity copolymer of propylene with an α-olefin having at least 4 carbon atoms, (ii) a polymer composed mainly of 1-butene, or (iii) a combination of the low crystallinity copolymer or the mainly 1-butene polymer with a high crystallinity polymer made mostly of propylene and at least some of the components are crosslinked.

U.S. Pat. No. 4,960,820 discloses a blend of less than about 10 weight percent LMW, isotactic poly-1-butene polymer having a melt index of greater than 100 to 1000, and at least about 90 weight percent of a propylene polymer having a melt index of less than 60.

U.S. Pat. No. 5,468,807 discloses a resin composition including 20–80 weight percent of an amorphous polyolefin having a propylene and/or butene-1 component of at least 50 weight percent, and 20–80 weight percent of a crystalline polypropylene, which is allegedly well-balanced in mechanical strength and flexibility.

U.S. Pat. No. 5,478,891 discloses blended polymer compositions of (a) a HMW copolymer of ethylene and an alphaolefin having at least 4 carbons, and (b) an amorphous polypropylene and/or amorphous polyolefin, or mixtures thereof, for use in hot melt adhesives, coatings, sealants, asphalt or bitumen modifiers, and plastics additives. Component (a) is described as generally rigid at room temperatures and component (b) is described as having a molecular weight range of about 300 to 60,000, where the blends have a viscosity of between approximately 650 to 46,000 cPs.

U.S. Pat. No. 5,512,625 discloses a thermoplastic hot-melt adhesive from a polymer blend of (a) an oligomer of an alpha-olefin having at least eight carbon atoms in the monomer and an oligomer molecular weight of less than 5,000, and (b) a mixture of a substantially amorphous poly-alpha-olefin and a substantially crystalline poly-alpha-olefin to provide an allegedly improved impact strength, viscosity of between about 130 to 18,000 cPs from 180° C. to 200° C., and flexibility at low temperatures.

It has also been known to use certain types of polymers and polymer blends in fibers for use in non-woven applications, such as webs, films, foams, and the like. For example, EP Publication No. 0,586,937 A1 discloses a non-woven fabric made with multi-component polymeric strands including a blend of polyolefin and elastomeric thermoplastic material in one side or as the sheath of multi-component polymeric strands.

U.S. Pat. No. 5,719,219 discloses a melt extrudable, moisture curable thermoplastic polymer produced from a silane modified elastomeric polymer.

U.S. Pat. No. 5,714,256 discloses methods for producing non-woven fabrics with a wider bonding window by forming the webs from thermoplastic polymer blends having 0.5 weight percent to 25 weight percent syndiotactic polypropylene. Such webs may then be thermally bonded to the non-woven web, and have a bonding window at least 10° F. wider than that of a similar web without syndiotactic polypropylene.

It would be advantageous, however, to produce polyolefin blends having improved properties, such as processing characteristics and durability, for use in non-woven products. It is also desired to produce a polymer blend for use in a non-woven product, wherein the blend has a sufficiently high melt viscosity to provide tensile strength, yet has a low crystallinity and a high elongation capability. It is also desired to obtain polymer blends that have a sufficiently high "open time" to impart adhesive characteristics. It is also desired to produce a polymer blend for use in adhesives using two miscible polymers having similar crystallinities, such that the resulting polymer blend has substantial transparency and a single $T_g$ and melting point, for example. These characteristics are desired in polymer blends to create polymers having a variety of new uses and improved capabilities, including non-woven products and adhesives.

SUMMARY OF THE INVENTION

The invention relates to a method for preparing a fiber, thread or yarn, by preparing a polymer blend of a predominantly atactic flexible polyolefin polymer having a high weight average molecular weight of at least about 100,000 and a heat of fusion of about 0.4 J/g to 75 J/g and an isotactic polypropylene polymer, and forming the polymer blend into a fiber, thread or yarn, wherein the flexible polymer is present in an amount sufficient to increase the elasticity of the fiber, thread or yarn to inhibit substantial breakage thereof, so as to produce fibers having an increased elongation and a reduced tensile modulus.

In one embodiment, the flexible polyolefin polymer is prepared by polymerizing propylene with at least one second monomer of a $C_2$–$C_{20}$ polyalphaolefin. In a preferred embodiment, the second monomer is selected to be ethylene. In another embodiment, the second monomer is provided in the polymer blend in an amount from about 2 to 20 weight percent of the flexible polyolefin polymer weight. In a preferred embodiment, the second monomer is provided in the polymer blend in an amount from about 6 to 14 weight percent of the flexible polyolefin polymer weight.

In another embodiment, the isotactic polypropylene polymer is prepared by polymerizing propylene with at least one second monomer of a $C_2$–$C_{20}$ polyalphaolefin. In a preferred embodiment, the second monomer is selected to be ethylene. In another embodiment, the second monomer is provided in the polymer blend in an amount from about 1.5 to 20 weight percent of the atactic polypropylene polymer weight. In yet another embodiment, the at least one of the flexible polyolefin polymer or the isotactic polypropylene polymer is a propylene homopolymer.

In a further embodiment, the flexible polyolefin polymer is provided in an amount from about 3 to 80 weight percent of the polymer blend weight. In another embodiment, the polymer blend has an elongation at break of between about 300 to 669 percent. In another embodiment, the fibers, threads or yarns are formed by spinbonding, meltblowing, meltspraying, or bond carding.

In a preferred embodiment, the fiber, thread or yarn is formed into a non-woven product. In another embodiment, the non-woven product is selected to be at least one of a web, a film, a foam, or a laminate. In another embodiment, the fibers, threads or yarns are configured in repeating pattern.

The invention also relates to a fiber, thread or yarn of a polymer blend including a predominantly atactic flexible polyolefin polymer having a high weight average molecular weight of at least about 100,000, a melt flow rate of between about 0.3 g/10 min. to 30 g/10 min. at 230° C., a polydispersity index of less than about 10, and a heat of fusion of about 0.4 J/g to 75 J/g, and an isotactic polypropylene polymer. The invention further relates to a non-woven product including the fiber, thread or yarn. In one embodiment, the fibers are arranged in a repeating pattern. In another embodiment, at least one of the flexible polyolefin polymer or the isotactic polypropylene polymer is a propylene homopolymer. In yet another embodiment, the flexible polyolefin polymer includes propylene polymerized with at least one second monomer of a $C_2$–$C_{20}$ polyalphaolefin.

The invention further relates to a composite article of a plurality of the fibers, threads, or yarns m contact with an adhesive having an adhesive polymer blend of a predominantly atactic flexible polyolefin polymer having a high weight average molecular weight of at least about 100,000 and a heat of fusion of about 0.4 J/g to 75 J/g, and an atactic polyolefin polymer having a low number average molecular weight of below about 25,000 and a heat of fusion of about 0.1 to 20 J/g, wherein the high molecular weight polymer and low molecular weight polymer are sufficiently miscible to impart a single glass transition temperature and an open time to the polymer blend, and the low molecular weight polymer is present in an amount sufficient to impart a melt viscosity of greater than about 8,000 cPs at room temperature and a crystallinity below about 28 J/g to the adhesive polymer blend.

The invention further relates to a composite article including fibers, threads, or yarn arranged in a non-woven pattern, and an adhesive component including a predominantly atactic flexible polyolefin polymer having a high weight average molecular weight of at least about 100,000 and a heat of fusion of about 0.4 J/g to 75 J/g, and an atactic polyolefin polymer having a low number average molecular weight of below about 25,000 and a heat of fusion of about 0.1 to 20 J/g, wherein the high molecular weight polymer and low molecular weight polymer are sufficiently miscible to impart a single glass transition temperature and an open time to the polymer blend, and the low molecular weight polymer is present in an amount sufficient to impart a melt viscosity of greater than about 8,000 cPs at room temperature and a crystallinity below about 28 J/g to the polymer blend.

The invention further relates to a polymer blend including a predominantly atactic flexible polyolefin polymer including propylene copolymerized with ethylene present in an amount from about 1 to 40 weight percent of the polymer, wherein the polymer has a high weight average molecular weight of at least about 100,000 and a heat of fusion of about 0.4 J/g to 75 J/g, and an atactic polyolefin polymer having a low number average molecular weight of below about 25,000 and a heat of fusion of about 0.1 to 20 J/g, wherein the high molecular weight polymer and low molecular weight polymer are sufficiently miscible to impart a single glass transition temperature and an open time to the polymer blend, and the low molecular weight polymer is present in an amount sufficient to impart a melt viscosity of greater than about 8,000 cPs at room temperature and a crystallinity below about 28 J/g to the polymer blend. The invention also relates to adhesives including this polymer blend.

In another embodiment, the ethylene is present in an amount from about 1.5 to 20 weight percent of the flexible polymer. In a preferred embodiment, the ethylene is present in an amount from about 2 to 12 weight percent of the flexible polymer. In another embodiment, the atactic polyolefin polymer includes propylene copolymerized with a second monomer comprising $C_2$–$C_{20}$polyalphaolefin. In a preferred embodiment, the second monomer is present in an amount from about 2 to 70 weight percent of the atactic polyolefin polymer.

DETAILED DESCRIPTION OF THE INVENTION

It has now been advantageously found by Huntsman Polymer Corporation that when certain flexible polyolefin polymers (FPOs), as described in U.S. application Ser. No. 08/878,129 and as part of the blends in U.S. Pat. No. 5,723,546, are blended with isotactic polypropylene polymers they provide advantageously beneficial polymer blends having improved hysteresis, strength, reduced stress decay, and creep properties over prior art materials, which makes the blends herein particularly useful for preparing fibers, threads, or yarns for use in a variety of non-woven products.

It has also been discovered that blending low crystallinity, HMW APAOs with low molecular weight ("LMW") APAOs provides the desired high melt viscosity, open time, tensile strength with a low crystallinity, and other desirable properties discussed herein. The polymer blends also have a high elongation and flexibility capability even at low temperatures, yet have superior high temperature resistance. The new polymer blends also have a sufficiently long "open time" to impart desired adhesive characteristics, and are substantially transparent (i.e., excellent clarity) and preferably have only one $T_g$ due to the miscibility of the two polymer components. These adhesive blends may also be advantageously used in combination with the non-woven product blends to form composites.

PREPARATION OF FLEXIBLE POLYOLEFINS (FPOs)

Several different families of propylene-based polymers, for example, may be prepared in a polymerization reactor. Some examples of these polymer families include, but are not limited to: isotactic propylene homopolymers, isotactic propylene/ethylene copolymers, amorphous poly-α-olefins ("APAO") propylene homopolymers, APAO propylene/ethylene copolymers, APAO propylene/butene copolymers, FPO propylene homopolymers, FPO propylene/ethylene copolymers, and FPO propylene/butene copolymers. Following the polymerization reaction, conventional processing technology required addition of large amounts of water to transport the polymer to bulky storage tanks for later processing. The FPO polymers may be processed in such a conventional manner, or they may be transported directly from the polymerization reactor to the final extruder via a kneader-extruder device, which assists in devolatilization of unreacted monomer(s). A preferred device, which maintains a substantially constant inventory of polymer therein, is disclosed in co-pending application Ser. Nos. 08/598,820 and 08/630,800, the disclosures of which are expressly incorporated herein by reference thereto. The polymer is fed, whether from conventional storage tanks or the novel kneader-extruder, into the final extruder. In the extruder, the polyolefin material is typically mixed with small amounts of water to deactivate any remaining catalyst(s) in the material and antioxidants. Heating the material further drives off any unreacted monomer(s), antioxidant solvents and excess steam added during this stage. Finally, the polyolefin material is typically transferred to a pelletizer where it is pelletized for storage and/or use.

The FPO polymers are typically propylene homopolymers, but they may also be propylene in a mixture with at least one other monomeric raw material, such as a $C_{2-12}$alkene. The other monomeric raw materials are alpha-olefins in a preferred embodiment, such as ethylene, 1-butene, 1-pentene, and 1-octene. A particularly preferred component for use in the FPO polymer of propylene is a copolymer of ethylene, typically in an amount from about 1 to 40 weight percent, preferably in an amount from about 5 to 20 weight percent, and more preferably in an amount from about 6 to 14 weight percent, of the polymer composition. In one embodiment, the ethylene is increased in the monomeric raw material to inhibit or substantially eliminate the effects of the external donor to varying degrees, i.e., to inhibit the ability of the external donor to increase the crystallinity of propylene domains within the polyolefin polymer.

The FPO polymers are characterized by a variety of properties. The most important of these properties are the degree of crystallinity and the degree of polymerization. Crystallinity, or heat of fusion ($\Delta H_f$) is typically measured by ASTM Method D-3417 (DSC). The polymers of the present invention have a heat of fusion that may range from about 0.4 J/g to 75 J/g, preferably about 15 J/g to 60 J/g, and more preferably about 25 J/g to 55 J/g, and a melt flow rate of between about 0.3 to 15 g/10 min. (at 230° C.). More preferred melt flow rates are discussed herein. Products produced with the FPO polymers advantageously tend to feel softer, smoother, and more silky to the touch, rather than being more rigid, more tacky and having a slightly sticky feel as with products produced using conventional catalysts. The reduced stickiness is believed to be achieved by increasing the molecular weight average, and, in particular, reducing the low molecular weight portions and decreasing the band of molecular weights. This imparts improved processing characteristics to the flexible polyolefin polymers. This is also believed to be accomplished by the use of an internal modifier present in the pro-catalyst portion of the catalyst present when polymerizing the polyolefin polymers of the present invention. An example of an internal modifier is the nitrogen-based electron donor of the present invention, preferably 2,6-lutidine and 6-chloro-2-picoline. When it is desired to alter the crystallinity of the polyolefin polymers, an external modifier of a silane may be added.

MFR is measured according to ASTM-D1238 standard Method A/B (2.16 kg/230° C.), such as on a Kayness Galaxy I Melt Indexer. The methyl ethyl ketone ("MEK") solution percent was determined by extracting about 5 g of polymer with 100 mL of boiling methyl ethyl ketone for 6 hours. Tensile tests (ASTM-D638) were performed on an Instron 1125 with Type I injection molded tensile bars at test speed of 2"/min. The VICAT softening point was measured in accordance with ASTM-D1525. Shore D hardness was determined in accordance with ASTM-D2240. Percent tensile set was measured after 300 percent extension and calculated by the following equation:

% Tensile Set=$(L_f-L_i)(L_n-L_i) \times 100\%$ where $L_i$ is the initial separation, $L_n$ is the extension, and $L_f$ is the final separation. A variety of other characteristics may be used to describe these polymers as well, such as VICAT softening point of about 40° C. to 75° C., and preferably 45° C. to 70° C.; Shore D hardness of about 30 to 65, and more preferably about 40 to 55; tensile modulus; tensile stress; a melt swell ratio of about 1.6 or below, preferably about 1.5 or below, and most preferably about 1.4 or below; and the like. The VICAT softening point and Shore D hardness will vary depending on the melt flow rate, heat of fusion, and the like in the polymer product. The properties vary depending upon the specific FPO polymer produced, which is dependent upon the exact ratios of Al:Ti (co-catalyst to procatalyst) and Si:Ti (external modifier to pro-catalyst), as well as the specific silane or other similar compound used in the pro-catalyst and the external modifier. Thus, these polymers are defined primarily by means of their crystallinity, or heat of fusion, their melt flow rate, and their molecular weight distribution, or polydispersity index ("MWD" or "PDI").

The molecular weight distribution, or polydispersity index, of the FPO polymers is about 10 or lower, preferably about 9 or lower, and most preferably about 8.5 or lower. The PDI is a ratio of the molecular weight average ($M_w$) over the molecular number average ($M_n$). The melt swell ratio is measured by the ratio of the diameter of a strand of extruded polymer to the diameter of the orifice through which it was extruded. A lower melt swell ratio is an indicator of a lower PDI, which itself indicates a narrower molecular weight distribution and, therefore, a less sticky, tacky, FPO polymer product. A low PDI combined with a low melt flow rate advantageously provides the polymers of the present invention with characteristics desired in the art. For example, a low MFR is characteristic of the reduced stickiness associated with the processing of the polymer, both during production and as a final product for consumer or industrial usage. Additionally, the low MFR of the FPO polymers tends to result in a higher melt strength and higher viscosity, which vastly facilitates the production of various useful articles such as blown films. "Reduced stickiness" and "reduction in stickiness," as used herein, typically is measured by the MEK soluble fraction of the polymer. A polymer having reduced stickiness is generally where about 1 to 12 weight percent, preferably about 2 to 5 weight percent, of the polymer is soluble in MEK. Although not wishing to be bound by any particular theory, it is believed that the FPO polymer softens the isotactic polypropylene polymer, i.e., reduces the crystallinity, and increases the elasticity of the blend, i.e., elongation.

Various additives may be included in the FPO polymers, such as antioxidants, anti-block agents, slip or anti-slip additives, UV stabilizers, pigments, and the like. Adding or removing hydrogen during the polymerization described herein may affect the MFR of the FPO polymers, while having minimal impact on the degree of crystallinity.

All the polymeric FPO materials disclosed herein, or in the applications or patents incorporated herein by reference, are useful in all of the polymer blends of the invention. These FPO materials are typically prepared using the novel catalyst material described herein and in the incorporated material from copending U.S. application Ser. Nos. 08/878,129 and 08/779,762, the disclosures of which are expressly incorporated herein by reference thereto. It should be noted, however, that the silane component used in one type of catalyst for preparation of the FPO polymers also includes any aryl, preferably $C_{5-12}$aryl compounds, rather than just $C_{1-6}$aryl compounds. Thus, the FPO material(s) may be combined or blended with any of a multitude of prior art amorphous polyolefin materials in order to arrive at novel and useful blend formulations suitable for use in various applications, such as adhesives, non-woven products, and fibers, yarns or threads used therein, for example.

The discovery of the catalyst materials disclosed herein has permitted a variety of new blend formulations including FPO polymer. In a preferred embodiment, the polymer blend is used in a non-woven product, where the blend contains from about 3 to 80 weight percent, preferably from about 20 to 50 weight percent, and more preferably from about 25 to 45 weight percent, of FPO polymer produced as described herein.

Another type of catalysts that have come into widespread usage in recent years for olefin polymerization are the metallocene catalysts. Generally speaking, metallocene catalysts include a transition metal atom, typically zirconium, hafnium, vanadium, or titanium having at least one cyclopentadienyl ligand pi-bonded thereto. Often the transition metal atom is positioned between two cyclopentadienyl ligands, wherein the metal atom is said to be "sandwiched" between the two ligands. The famous compound known as ferrocene is exemplary of such an arrangement.

In the field of olefin polymerization catalysis, much creative work has also been undertaken with regard to modification of the basic structure of ferrocene. Replacement of the iron atom by one of the aforesaid transition metals has provided a basic framework for investigators to modify with the hopes of producing polymers having hitherto unbeknownst beneficial physical properties. By substituting various organic and inorganic moieties in the position of the hydrogen atoms of the basic framework, a multitude of compounds useful in olefin polymerization have been discovered, with nearly each having its own unique effect on polymers produced using it as a catalyst. Examples of U.S. Patents which have been generated as a result of these types of modifications to the basic framework include: U.S. Pat. No. 5,594,080 ; 4,769,510 4,808,561; 4,871,705; 4,935,397; 5,578,690; 5,132,262; 5,208,357; 5,232,993 5,280,074; 5,314,973; 5,322,902; 5,349,100; 5,496,781; 5,525,690; 5,585,108; 5,631,202; 5,637,744; 5,329,033; 5,243,001; 5,241,025; 5,278,264; 5,227,440; 5,214,173; 5,162,466; 5,145,819; 5,120,867; 5,103,030; 5,084,534; 5,064,802; 5,057,475; 5,055,438; 5,017,714; 5,008,228; 4,937,299; 5,081,322; and 5,036,034, the entire contents of which, including patents and publications referenced therein, are herein incorporated by reference for the purpose of teaching one of ordinary skill in the art how to polymerize various polymeric products using metallocene catalysts. That is, it is not a critical factor for purposes of producing the blends in accordance hereto whether a given polypropylene that is mixed with the FPO polymers of this invention is produced using Ziegler/Natta type or metallocene type catalysts. Thus, any FPO polymeric product, or blend including such FPO polymer, produced from any type of catalyst may be used to produce a non-woven product, composite, or a fiber, thread or yarn, according to the invention. Preferably, however, the Ziegler/Natta type catalysts discussed herein are used to polymerize the FPO polymer component of the various blends of the invention.

FPO POLYMER/ISOTACTIC POLYPROPYLENE POLYMER BLENDS

In order to produce the blends of this invention, the FPO polymer and either an isotactic polypropylene polymer or a low molecular weight atactic APAO are combined as follows. The various polymer components are provided, preferably in their pelletized form, and mixed with one another. A method for achieving this is to first mix the pellets of different materials in the dry state in a tumbling chamber in which the pellets are repeatedly agitated by virtue of rotation of the chamber about an axis perpendicular to the forces of gravity for sufficient time to effect a good mix, i.e., provide a degree of uniformity known by those of ordinary skill in the art. The mixture may also contain other additives deemed desirable for the application at hand as described herein and known to those of ordinary skill in the art. Once the components have been well-mixed in the dry state, they are then typically fed into an extruder, such as the Haake Model TW-100, in which the materials are co-melted with one another, fed through the extruder via a single screw or plurality of screws and forced through a die equipped with a cutter whereby pellets of homogeneous polymer blend compositions according to this invention emerge. For example, Examples 100–104 below indicate some resulting blends of the invention.

Various additives may be included in either the flexible polyolefin polymer or a polymer blended therewith, or during the mixing of the FPO and another polymer to form a polymer blend. Suitable additives include antioxidants, UV stabilizers, pigments, tackifiers, waxes, plasticizers, anti-slip agents, and the like. Preferred anti-slip agents, when used, include IRGAFOS 1010, commercially available from Ciba-Geigy or DOVERFLOUS S9228, commercially available from Dover Chemical Inc. Adding or removing hydrogen during the polymerization described herein may affect the MFR of the FPO polymers, while having minimal impact on the degree of crystallinity. The effects of hydrogen addition or removal are known and understood by those of ordinary skill in the art.

The FPO polymerlisotactic polypropylene polymer blends of the invention, which preferably also have improved hysteresis, reduced stress decay, and improved creep properties, are beneficially processed into non-woven products. Such non-woven products include webs, films, foams, laminates, and a variety of other useful forms known to those of ordinary skill in the art. These non-woven products have a vast array of uses, including agricultural, processing and storage particularly of perishables such as food, medical care, clothing such as diapers, personal care, and the like.

The blends disclosed herein may be spunbond, meltblown, meltsprayed, bond carded, and the like, to produce multiple filaments, fibers, or yarns of the composition, which may then be prepared into non-woven webs or other products discussed herein or known to those of ordinary skill in the art. Non-woven webs which typically have improved processing and durability due to the materials therein, may be may be obtained by using materials having high elasticity such as the polymer blends disclosed herein. As used herein, the terms "non-woven fabric" or "non-woven web" or "non-woven product" are each used to mean a web of material formed from the polymer blends disclosed herein. The material has individual fibers, threads, or yarns (collectively called "fibers") that are intertwined in some manner but without weaving. The fibers may be combined by non-identifiable (non-repeated pattern) or identifiable (repeated pattern) intertvining. A variety of methods to prepare fibers, threads and yarns from blends for use in non-woven products according to the invention are disclosed in U.S. Pat. Nos. 5,719,219 and 5,714,256 and EP Publication No. 0,586,937 A1, the contents of which are expressly incorporated herein by reference thereto for this purpose. The invention also includes any other means to prepare fibers, threads and yarns from blends for use in non-woven products known to those of ordinary skill in the art.

The isotactic polypropylene polymer used in the blend may be any isotactic polypropylene suitable for use in a blend with other conventional polymers. The polypropylene polymer is typically present in an amount from about 20 to 97 weight percent, preferably about 50 to 80 weight percent, and more preferably about 55 to 75 weight percent, of polymer blend produced as described herein. The crystallinity of the polypropylene polymer is typically from about 40 J/g to 100 J/g, preferably about 60 Jg to 90 J/g, although the crystallinity of an isotactic polypropylene polymer is readily determinable by one of ordinary skill in the art.

The isotactic polypropylene polymer may also be copolymerized with at least one other $C_2$–$C_{12}$alkene. The alkene is preferably another alphaolefin, such as ethylene, 1-butene, 1-pentene, and 1-octene. A particularly preferred component for use in the isotactic polymer portion of the FPO lisotactic polypropylene polymer blend is a copolymer of ethylene or 1-butene, either of which is typically present in an amount from about 1 to 40 weight percent, preferably about 1.5 to 20 weight percent, and more preferably about 2 to 12 weight percent, of the polymer composition. Exemplary homopolymers of isotactic polypropylene suitable for use in the invention include 41E4, 31S4, and 11S1A, all of which are commercially available from Huntsman Polymers Corporation of Odessa, Tex. Exemplary copolymers of isotactic polypropylene with an ethylene copolymer suitable for use herein include 13R9A and 23N10, also commercially available from Huntsman Polymers Corporation.

FPO POLYMERS/LMW APAOs FOR ADHESIVES

The blends of low crystallinity HMW APAOs (FPOs) with LMW APAOs discussed below provide the desired high melt viscosity, open time, tensile strength with a low crystallinity, and other desirable properties discussed herein. The polymer blends also have a high elongation and flexibility capability even at low temperatures, yet have superior high temperature resistance. The new polymer blends also have a sufficiently long "open time" to impart desired adhesive characteristics, and are substantially transparent (i.e., excellent clarity) and preferably have only one $T_g$ due to the miscibility of the two polymer components. Thus, these polymer blends are particularly useful as adhesive compositions, or in combination with any conventional adhesive composition to provide an enhanced adhesive composition.

The APAO blends herein expand and increase the range of melt viscosities available in conventional polymer blends. As the molecular weight of the APAO blends increase, they become stiffer with improved tensile properties and higher elongation (tensile strain at break). Even though the melt viscosity and the crystallinity increase in the blends of the invention, the blends typically have closely controlled RBSP, OT, and melt viscosity properties. These blended products have improved holding power and shear adhesion failure temperature values, as well as good "green strength," which advantageously improves their desirability for non-woven applications, hot melt adhesive applications, polymeric modifiers, roofing components, such as a modified bitumen roofing membrane or a built-up roofing formulation, and in asphalt and other modified bitumen applications.

Several different families of propylene-based polymers, for example, may be used for the preparation of the polymer blends, methods, and composites, of the present invention. Some examples of these APAO polymer families include, but are not limited to: APAO propylene homopolymers, APAO propylene/ethylene copolymers, APAO propylene/butene copolymers, FPO propylene homopolymers, FPO propylene/ethylene copolymers, and FPO propylene/butene copolymers. Typically, any combination of ethylene, propylene, and butene may be used in the LMW or HMW APAO (FPO) polymers that are combined to form the polymer blend.

The LMW APAO polymer used in the blend may be any of the polymer families described above, provided the polymer has the appropriate characteristics discussed herein, such as molecular weight, crystallinity, melt viscosity, and the like. Preferably, the LMW APAO polymer predominantly includes ethylene, propylene, butene, or copolymers or mixtures thereof. More preferably, the LMW APAO polymer is an ethylene/propylene copolymer or a butene/propylene copolymer, and most preferably, the LMW APAO polymer is about 1 to 20 weight percent ethylene and about 80 to 99 weight percent propylene copolymer, or about 2 to 70 weight percent butene, preferably 30 to 65 weight percent butene, in a copolymer with about 30 to 98 weight percent propylene, preferably about 35 to 70 weight percent propylene. The LMW APAO polymer preferably has a number average molecular weight of about 4,000 to 16,000 g/mol, more preferably about 6,000 to 12,000 g/mol, and most preferably about 8,000 to 12,000 g/mol. The LMW APAO polymer has a crystallinity, or heat of fusion, of about 0.1 to 20 J/g, preferably about 0.5 to 15 J/g, more preferably about 1 to 10 J/g, as measured by DSC (ASTM D-3417). Moreover, the LMW APAO may typically be chosen from a broad range of melt viscosities ranging from about 400 to 20,000 cPs (at 190° C.). As higher melt viscosities are a desired characteristic in the polymer blend and products produced therefrom, it is preferred to use higher melt viscosities in the LMW APAO. The REXTAC® (LMW APAO) series of polymers, as well as various other polymers discussed herein, are commercially available from Huntsman Polymers Corporation of Odessa, Tex. and are useful for the LMW APAO portion of the polymer blends.

Any of the polymer families listed above may be also used for the HMW APAO (FPO) polymer, provided the family has the appropriate characteristics discussed herein, such as molecular weight, crystallinity, melt flow rate, and the like. The FPO-type polymers, including polymers of predominantly ethylene, propylene, butene, or copolymers or mixtures thereof, are preferred for the HMW APAO (FPO) polymer used in the polymer blend, as they are characterized by a variety of desirable properties described herein. The most important of these properties are the degree of crystallinity and the degree of polymerization, as measured by the heat of fusion and the melt flow rate. Heat of fusion ($\Delta H_f$) is typically measured by DSC using an ASTM standard method. The FPO polymers (HMW APAOs) of the present invention have a heat of fusion that may range from about 15 to 60 J/g and a melt flow rate of between about 0.3 to 100 g/10 min. (at 230° C.). Manufactured products produced with the FPO polymers alone advantageously tend to feel softer, smoother, and more silky to the touch, rather than being more rigid and drier to the touch, as with products produced using conventional isotactic polypropylenes.

The FPO polymers used in the blend typically have a $\overline{M}_n$ of about 15,000 g/mol to 30,000 g/mol, preferably about 20,000 to 25,000 g/mol, and more preferably about 21,000 to 24,000 g/mol. The specific $\overline{M}_n$ will vary depending upon the particular HMW APAO used, which depends upon the desired final properties and applied use for the polymer blend. The weight average molecular weight will vary more dramatically depending upon the HMW APAO used, although it is generally over 100,000, preferably between about 130,000 g/mol to 230,000 g/mol and more preferably between about 150,000 to 200,000 g/mol.

The use of FPO polymers having low crystallinity, which may be prepared by using a catalyst system that produces polymers with well-defined physical properties, facilitates the production of polymer blends having the reproducible specifications required of adhesive formulations and other uses. Such a catalyst system, and a variety of low crystallinity, HMW APAO polymers produced thereby and suitable for use in the present invention, are disclosed in copending U.S. patent application Ser. No. 08/779,762, the disclosure of which is expressly incorporated herein by reference thereto.

The polymers disclosed therein are preferred HMW APAOs for use in the polymer blends of the present invention, as they advantageously have a low crystallinity required for the present invention in the range of about 15 to 60 J/g while also having a melt flow rate of between about 0.3 to 100 g/10 min, and every whole integer therebetween. Preferably, the melt flow rate (at 230° C.) of the HMW APAOs of the present invention is between about 0.4 to 50 g/10 min., more preferably between about 0.5 to 20 g/10 min., and most preferably between about 1 to 15 g/10 min, and every whole integer therebetween. The MFR may be varied accordingly by varying the catalyst recipe, as disclosed therein. These HMW APAO ("FPO polymers") polymers, also described as flexible polyolefins, are advantageously produced by the use of a catalyst containing a pro-catalyst capable of imparting to a polymer a crystallinity as low as about 15 J/g and a low melt flow rate, an organometallic compound, and, optionally, an external modifier that is capable of increasing the low crystallinity up to as high as 60 J/g, depending upon the amount and type of regiocontrolling external modifier included in the catalyst.

A variety of these preferred HMW APAO polymers are available from Huntsman Polymers Corporation, Odessa, Tex. under the "FPO polymer" or "FPD" designations, such as FPD-100, FPD400, FPD-2300, FPD-1700, FPD-1710, FPD-1720, FPD-1800, FPD-1810, and FPD-1820. All of these HMW APAO polymers have a crystallinity between about 15 to 65 J/g and all are preferred HMW APAOs for use herein, although the FPD-100, FPD-400, and FPD-2300 are more preferred types of HIMW APAO polymers.

Although a crystallinity, or heat of fusion, of between about 15 to 60 J/g is suitable for use in the polymer blends of the invention, it is preferred to use a HMW APAO having a lower degree of crystallinity to impart a reduced crystallinity in the polymer blend. Preferably, the heat of fusion is between about 18 to 50 J/g, more preferably it is between about 20 to 35 J/g, and most preferably the heat of fusion is between about 22 to 30 J/g.

The HMW APAOs, preferably elastomeric, with high melt viscosity values and low crystallinity, are blended with the LMW APAOs, which also preferably have a high melt viscosity, to obtain the desired characteristics described herein.

These individual polymers, as well as blends produced thereby, may be characterized following standard test methods set forth by the American Society for Testing and Materials (ASTM) that are widely used in the hot melt adhesives industry. These test methods generally are as follows.

Melt viscosity, MV (cPs or mPa•s), is typically determined according to ASTM D-3236, and it measures a liquid or molten polymer's internal friction, i.e., its resistance to flow. This distinctive property determines the flowability and degree of wetting, or penetration, of a substrate by the molten polymer; it provides an indication of its processability. Melt viscosity is generally directly related to a polymer's molecular weight, and it is reported in millipascalxsec (mPa*sec.), or centipoise, using a BROOKFIELD® THERMOSEL RVT VISCOMETER.

Needle penetration, NP (dmm) is usually measured according to ASTM D-1321. With thermoplastics and elastomers, this test method, which measures the depth to which a weighted needle penetrates the polymer surface and determines the resistance of the polymer to deformation by penetration, is often used as a simple measure of stiffness (or softness).

Ring and ball softening point, RBSP (° C./° F.), is typically measured according to ASTM E-28. Due to the predominantly amorphous nature of the APAO polyolefins herein, melting does not take place at a sharp, definite temperature. Rather, as the temperature increases, these APAO polymers gradually change from solid to soft and then to liquid materials. This test method generally measures the precise temperature at which a disc of polymer sample submerged in a glycerine bath and heated at a rate of 5.5° C./min. (10° F./min.) becomes soft enough to allow the test object, a steel ball, to drop through the sample. The softening point of a polymer, reported in ° C. (° F.) is important, because it typically indicates the polymer's heat resistance, application temperature and solidification point.

Open Time, OT (sec), is typically measured by ASTM D-4497, which measures the time, in seconds, between application of a thin film of the hot melt adhesive and the time just prior to the hot melt film losing its wetting ability (adhesiveness) because of solidification. More particularly, this may be measured by drawing down a thin film of polymer and applying one-inch wide strips of paper onto the film with a tnvo-pound roller at specific time intervals. Generally, the paper strips are applied at 10, 20, 40, 60, 90, 120, and 240 seconds after film draw-down. After waiting for approximately five (5) minutes, the paper strips are pulled off of the film. When the paper tears, an open time exists. Under the ASTM method, at least 50 percent of the paper must remain for there to be an open time. However, under the more stringent REXENE® method used in this application, at least 90 percent of the fiber must remain on the polymer.

Other standard test methods were used to determine the polymer's heat of fusion and melting point (ASTM D-3417), glass transition temperature (ASTM D-3418) and tensile properties (ASTM D-638).

The polymer blends of the present invention may be prepared by any conventional or other suitable method of combining polymers. For example, the LMW APAO and HMW APAO may be combined by mixing in a batch mixer or kneading with a sigma blade kneader, which is named after its sigma-shaped blade that virtually scrapes the sides of the container to facilitate blending of the polymer. Selection of the LMW and HMW APAO polymers is crucial to obtain the polymer blends of the invention, of course, although to be properly blended the APAOs must simply be in a molten state when combined by mixing or kneading. Another suitable way to combine the LMW and HMW APAOs is in an extruder. When extrusion is used, the APAO polymers should be heated above the softening point. Naturally, the temperature at which the LMW and HMW APAOs become molten or soft will vary according to the particular APAOs selected. It is to be understood that once polymers have been selected, one of ordinary skill in the art is capable of determining the temperature at which the polymers will become molten or soft as required for proper mixing.

The polymer blends useful as adhesives or in composites typically contain about 2 to 40 weight percent of the HMW APAO polymer with about 60 to 98 weight percent LMW APAO polymer. Preferably, the polymer blends contain about 5 to 35 weight percent of the HMW APAO, more preferably about 10 to 30 weight percent of the HMW APAO, with the remainder being LMW APAO. The amount of one or both of the HMW and LMW APAO polymers may be correspondingly reduced if an additive is included, typically in an amount up to about 5 weight percent of the total polymer blend.

The polymer blends of the present invention may be described by various characteristics, which are set forth below. For example, it is desired that the polymer blends have a broad molecular weight distribution. A high tensile stress at break is desired, and this value is typically about 20 psi to 800 psi, preferably about 50 psi to 700 psi, and more preferably about 100 psi to 600 psi. A large open time is desired, typically at least about 10 seconds, preferably at least about 30 seconds, more preferably at least about 50 seconds, and most preferably at least about 100 seconds. A high melt viscosity is additionally desired, typically between about 8,000 to 340,000 cPs, preferably between about 15,000 to 320,000 cPs, more preferably between about 25,000 to 300,000 cPs, and most preferably between about 50,000 to 250,000 cPs, and every thousand integer therebetween.

The melting point of the polymer blends are typically between about 95° C. to 155° C., preferably about 137° C. to 153° C., and more preferably about 139° C. to 151° C. The preferred polymer blends are those where only one melting point exists, indicating the LMW and HMW APAO polymers are substantially miscible. The most preferred polymer blends exhibit only one melting point, which falls within the more preferable melting point range, and the blends contain minimal, if any, cross-linking. The $T_g$ is an even better indicator of miscibility between the HMW and LMW APAOs than the melting point, and the $T_g$ is typically between about −5° C. to −35° C., preferably between about −10° C. and −30° C., and more preferably between about −15° C. to −25° C. The optical appearance of the polymer blends is important, as well, with substantially clear blends being preferred. The use of substantially miscible HMW and LMW APAOs in the polymer blends will substantially reduce the haziness typically found in blends of incompatible polymers.

The polymer blends are relatively soft, and are thus measured on the Shore A scale at between about 40 to 80, preferably between about 50 to 70, and more preferably between about 55 to 65. On the Shore D scale, the polymer blends of the present invention are typically between about 6 to 14, preferably between about 7 to 13, and more preferably between about 8 to 12. The tensile strain at break is typically between about 30 percent elongation for lower MW polymer blends to a "no break" strain, i.e., there is no break in the polymer blend at approximately 310 percent elongation. Although the blends are fairly soft, the tensile modulus at 23° C. is between about 500 psi to 20,000 psi, or roughly 100 to 1,400 kg/cm². Preferably, the tensile modulus is between about 750 psi to 15,000 psi, and more preferably between about 1,000 psi to 10,000 psi.

The polymer blends also have a relatively low crystallinity, typically having a heat of fusion below about 28 J/g, preferably below about 20 J/g, and more preferably below about 10 J/g. Such blends are typically obtained by using a HMW APAO component having a low crystallinity.

The composite articles of the invention include the above described polymer blends of FPO and atactic polyolefin polymer as an adhesive component together with a non-woven product. It should be understood that any adhesive component may also be used with the fiber, thread or yarn of the present invention, as well as that any non-woven product may be used with the adhesive composition of the present invention, to obtain a composite article of the present invention. The non-woven products may be any conventional non-woven products known to those of ordinary skill in the art, although they are preferably the non-woven products described herein of a polymer blend of FPO and isotactic polypropylene polymer. For example, the composite articles include any of the non-woven products, such as an item of clothing, that includes an adhesive composition. One such example of a composite article is a layered non-woven disposable diaper having adhesive between the layers.

It should be understood that all ranges of amounts, characteristics, properties, and the like described herein include every whole integer within each range described.

EXAMPLES

The polymer blends used in the invention are further defined by reference to the following examples describing in detail the preparation of the compounds and compositions useful in the blended products disclosed herein. It will be apparent to those skilled in the art that many modifications, both to materials and methods, may be practiced without departing from the purpose and interest of this invention.

A variety of catalysts for the preparation of FPO polymers were prepared and tested. Polymerization tests were conducted in liquid polypropylene in a 1.0 L stainless steel autoclave equipped with an agitator. After the reactor was thoroughly purged with nitrogen to remove any catalyst poisons, such as moisture and oxygen, 10 mg of solid pro-catalyst component were charged into the reactor as a 1 weight percent mixture in dry mineral oil, followed by addition of triethylaluminum co-catalyst in a prescribed amount to obtain an Al/Ti molar ratio of about 200:1. 300 g of liquid propylene were then charged into the reactor and the polymerization proceeded at 60° C. for one hour under agitation sufficient to mix the components. At the end of the hour, the unreacted propylene was vented off and the polymer product was recovered.

The "C-Donor" was cyclohexylmethyldimethoxysilane, and "D-Donor" was dicyclopentyldimethoxysilane.

Examples 1–2
Conventional Catalysts

A conventional catalyst may be prepared according to the disclosure of U.S. Pat. No. 4,347,158. Example 1 of the '158 patent describes such a catalyst preparation as follows. Anhydrous $MgCl_2$ was prepared by drying at 350° C. for 4 hours under an HCl blanket. 25 grams of this anhydrous $MgCl_2$, 4.34 g $AlCl_3$, and 7.01 g anisole were charged under nitrogen atmosphere into a vibrating ball mill having a 0.6 L capacity containing 316 stainless steel balls weighing a total of 3250 g and each having a diameter of 12 mm. This mixture was co-comminuted for 24 hours without temperature control. Titanium tetrachloride was precomplexed with ethyl benzoate (EB) in n-heptane at about 50° C. 6.19 g of this $TiCl_4EB$ complex was then charged into the vibrating ball mill after the prior 24 hour co-comminution of the other materials, and the resulting mixture co-comminuted for an additional 20 hours at ambient temperature and under inert atmosphere. This produced a solid catalyst component usable without requiring extraction or catalyst washing.

Another conventional catalyst was prepared, for comparison purposes with the catalysts of the present invention, approximately as follows: 30 g (0.315 mole) of $MgCl_2$ was co-comminuted with 5.22 g (0.0391 mole) $AlCl_3$ for 24 h in RBM under $N_2$ atmosphere. Then 4.02 g (0.0212 mole) of TiCl4 was added. Ball milling was continued for another 24 h. 30 g yellow pro-catalyst powder was collected. It was calculated that the titanium component was about 2.6 weight percent, the aluminum component was about 2.7 weight percent, the magnesium component was about 19.3 weight percent, and the Mg:Al:Ti ratio was about 8:1:0.5.

Examples 3–19
Effect of Type I internal donors

A variety of pro-catalysts and catalysts were prepared to examine the effect of Type I internal donors on the effective surface area and catalyst activity:

Example 3: Same as Example 6 below, except using 1.18 g EtOBz. Calc'd: Ti%=2.50; EB/Mg=0.025 (mol/mol).

Example 4: $MgCl_2$ of 30 g, $AlCl_3$ of 5.25 g and EtOBz of 2.36 g (0.0158 mole) were ball milled (VBM) for 16 h, then $TiCl_4$ of 4.02 g was added and the mixture was ball milled for another 16 h. Calc'n: Ti%=2.43; EB/Mg=0.05 (mol/mol).

Example 5: Same as Example 6, except using 4.72 g EtOBz. Calc'd: Ti%=2.31; EB/Mg=0.10 (mol/mol).

Example 6: 30 g $MgCl_2$ and 5.25 g $AlCl_3$ were ball milled (RBM) for 24 h, then 1.55 g (0.0131 mole) $(EtO)SiMe_3$ and 4.02 g $TiCl_4$ were added. The mixture was ball milled for another 24 h to give the pro-catalyst.

Example 7: 30 g $MgCl_2$ and 5.25 g $AlCl_3$ were ball milled (RBM) for 24 h, then 3.1 g (0.0263 mole) $(EtO)SiMe_3$ and 4.02 g $TiCl_4$ were added. The mixture was ball milled for another 24 h to give the pro-catalyst.

Example 8: 30 g $MgCl_2$ and 5.25 g $AlCl_3$ were ball milled (RBM) for 24 h, then 6.15 mL (0.0394 mole) $(EtO)SiMe_3$ and 4.02 g $TiCl_4$ were added. The mixture was ball milled for another 24 h to give the pro-catalyst.

Example 9: 30 g $MgCl_2$ and 5.25 g $AlCl_3$ were ball milled (RBM) for 24 h, then 2.47 g (0.0131 mole) C-donor and 4.02 g $TiCl_4$ were added. The mixture was ball milled for another 24 h to give the pro-catalyst.

Example 10: 30 g $MgCl_2$ and 5.25 g $AlCl_3$ were ball milled (RBM) for 24 h, then 7.42 g (0.0394 mole) C-donor and 4.02 g $TiCl_4$ were added. The mixture was ball milled for another 24 h to give the pro-catalyst.

Example 11: 30 g $MgCl_2$ and 5.25 g $AlCl_3$ were ball milled (RBM) for 24 h, then 3.0 g (0.0131 mole) D-donor and 4.02 g $TiCl_4$ were added. The mixture was ball milled for another 24 h to give the pro-catalyst.

Example 12: 30 g $MgCl_2$ and 5.25 g $AlCl_3$ were ball milled (RBM) for 24 h, then 9.0 g (0.0394 mole) D-donor and 4.02 g $TiCl_4$ were added. The mixture was ball milled for another 24 h to give the pro-catalyst.

Example 13: 5 g of Example 2 was suspended in 100 mL toluene, stirred at 60° C. for 1 h, filtered and suspended in 30 mL fresh toluene. 16.5 mL $TiCl_4$ and 0.74 mL (3.2 mmole) D-donor (Dicyclopentyldimethoxysilane) were added. Mixture was stirred at 90° C. for 1 h, filtered (solid dark brown), washed with heptane (turned to greenish yellow) and toluene (back to dark brown), again suspended in 30 mL toluene. 17 mL $TiCl_4$ was charged and mixture was stirred at 90° C. for another 1 h. Solid filtered out and thoroughly washed with heptane.

Example 14: 1) $MgCl_2$ 30 g, $AlCl_3$ 5.25 g and $(EtO)_3SiMe$ 7.02 g (0.0394 mole) were ball milled for 24 h. 2) 5 g of above precursor was suspended in 100 mL toluene, stirred at 60° C. for 1 h, filtered, solid washed with heptane, toluene and then suspended in 30 mL fresh toluene. 16.5 mL (150 mmole) $TiCl_4$ was charged (slurry turned brown). The slurry was stirred at 90° C. for 1 h, filtered, solid washed with heptane, toluene, then again suspended in 30 mL toluene. 16.5 mL $TiCl_4$ was charged and reacted at 90° C. for 1 h. The solid was washed with heptane. The solid was orange-red in toluene but turned to yellow after washed by heptane.

Example 15: 30 g $MgCl_2$ and 5.25 g $AlCl_3$ were ball milled (RBM) for 24 h, then 6.69 g (0.0394 mole) $SiCl_4$ and 4.02 g $TiCl_4$ were added. The mixture was ball milled for another 24 h to give the pro-catalyst.

Example 16: 30 g $MgCl_2$, 5.25 g $AlCl_3$ and 2.76 g dibutyl phthalate were co-ball milled for 24 h, then 4.02 g $TiCl_4$ was added. The mixture was ball milled for another 24 h to provide the pro-catalyst.

Example 17: 30 g $MgCl_2$ and 2.76 g dibutyl phthalate were co-ball milled for 24h, then 4.02 g $TiCl_4$ was added. The mixture was ball milled for another 24 h to provide the pro-catalyst.

Example 18: 30 g $MgCl_2$ and 5.25 g $AlCl_3$ were ball milled (RBM) for 24 h, then 7.68 g (0.0212 mole) diheptyl phthalate and 4.02 g (0.0212 mole) $TiCl_4$ were charged and ball milled for another 24 h.

Example 19: Same as Example 14 except without $(EtO)_3SiMe$ but with dropwise addition of 1.17 mL diheptyl phthalate (turned dark) before reacting at 90° C. for 1 h.

These pro-catalysts were used in a catalyst for the polymerization of polypropylene to produce polymers for use as the flexible polymer component having the characteristics in Tables I & II below:

TABLE I

| Example Number | Composition | Donor | Donor/Ti | Polymn. Run No | C.E. g/g-cat | $\Delta H_f$ J/g | m.p. °C. | MFR g/10 min | MEK sol % |
| --- | --- | --- | --- | --- | --- | --- | --- | --- | --- |
| 1 | $TiCl_4/MgCl_2/AlCl_3/$ EB/Anisole | EB & Anisole | nd | 2507-39 | 11900 | 42.9 | 155.9 | 11 | nd |
| 2 | $TiCl_4/MgCl_2/AlCl$ (BM) | None | 0 | 2536-1 | 16500 | 30 | 154 | 11 | 11 |
| 3 | $TiCl_4/MgCl_2/AlCl_3/$ EB (BM) | Ethyl Benzoate | 0.37 | 2536-25 | 17600 | 31.8 | 153.8 | 10.3 | 12.5 |
| 4 | $TiCl_4/MgCl_2/AlCl_3/$ EB (BM) | Ethyl Benzoate | 0.74 | 2536-21 | 18500 | 35.1 | 154.5 | 9.6 | 11.1 |
| 5 | $TiCl_4/MgCl_2/AlCl_3/$ EB (BM) | Ethyl Benzoate | 1.48 | 2536-27 | 13800 | 39.2 | 154.7 | 7.4 | 12.2 |
| 6 | $TiCl_4/MgCl_2/AlCl_3/$ $(EtO)SiMe_3$ (BM) | (EtO)Si Me3 | 0.62 | 2540-31 | 18800 | 36.1 | 153.9 | 8.4 | 10.4 |
| 7 | $TiCl_4/MgCl_2/AlCl_3/$ $(EtO)SiMe_3$ (BM) | (EtO)Si Me3 | 1.24 | 2536-99 | 23300 | 39.6 | 153.5 | 8.9 | 7.6 |
| 8 | $TiCl_4/MgCl_2/AlCl_3/$ $(EtO)SiMe_3$ (BM) | (EtO)Si Me3 | 1.86 | 2536-97 | 21000 | 43.9 | 152.4 | 15.3 | 7.8 |
| 9 | $TiCl_4/MgCl_2/AlCl_3/$ C-donor (BM) | C-donor | 0.62 | 2540-7 | 19400 | 33.7 | 153.1 | 8.6 | 7.8 |
| 10 | $TiCl_4/MgCl_{2/AlCl3}/$ C-donor (BM) | C-donor | 1.86 | 2536-95 | 13400 | 40.9 | 152.8 | 7.5 | 5.5 | nd = not determined
Polymerization conditions: 10 mg catalyst; 300 g propylene; Al/Ti = 200; 60° C. for 1 hour.

TABLE II

| Example Number | Composition | Donor | Donor/Ti | Polymn. Run No | C.E. g/g-cat | $\Delta H_f$ J/g | m.p. °C | MFR g/10 min | MEK sol % |
|---|---|---|---|---|---|---|---|---|---|
| 11 | TiCl$_4$/MgCl$_2$/AlCl$_3$/D-donor (BM) | D-donor | 0.62 | 2540-6 | 19800 | 35.9 | 153.7 | 9.9 | 5.7 |
| 12 | TiCl$_4$/MgCl$_2$/AlCl$_3$/D-donor (BM) | D-donor | 1.86 | 2536-93 | 13800 | 36.9 | 154.4 | 3.6 | 4.7 |
| 13 | TiCl$_4$/MgCl$_2$/AlCl$_3$/D-donor (Solution) | D-donor | nd | 2536-62 | 27300 | 37.7 | 154.2 | 12.7 | 9.4 |
| 14 | TiCl$_4$/MgCl$_2$/AlCl$_3$/(EtO)$_3$SiMe (Solution) | (EtO)$_3$SiMe | nd | 2536-54 | 18200 | 51.1 | 155.2 | 4.6 | 7.9 |
| 15 | TiCl$_4$/MgCl$_2$/AlCl$_3$/SiCl$_4$ (BM) | SiCl$_4$ | 1.86 | 2536-91 | 17500 | 34.2 | 153.6 | 13.7 | 7.1 |
| 16 | TiCl$_4$/MgCl$_2$/AlCl$_3$/DBP (BM) | Dibutyl Phthalate | 0.47 | 2541-59 | 13900 | 46.9 | 156.0 | 4.2 | 8.4 |
| 17 | TiCl$_4$/MgCl$_2$/DBP (BM) | Dibutyl Phthalate | 0.47 | 2541-62 | 9900 | 44.2 | 155.4 | 4.0 | 6.8 |
| 18 | TiCl$_4$/MgCl$_2$/AlCl$_3$/DHP (BM) | Diheptyl Phthalate | 1 | 2536-58 | 10700 | 49.7 | 156.1 | 0.75 | 4.5 |
| 19 | TiCl$_4$/MgCl$_2$/AlCl$_3$/DHP (Solution) | Diheptyl Phthalate | nd | 2536-56 | 9700 | 49.7 | 156.7 | 1.2 | 7.1 | nd = not determined
Polymerization conditions: 10 mg catalyst; 300 g propylene; Al/Ti = 200; 60° C. for 1 hour.

Examples 3–19 illustrate a variety of Type I donors and their effects on polymer properties. They were typically co-milled with catalyst supports (MgCl$_2$/AlCl$_3$) prior to TiCl$_4$ addition, except for the catalysts made by a solution process. The effect of the donors produced by the ball-mill method on productivity indicates silane donors are more effective than other donors in enhancing the productivity at low dosages. Those donors prepared by the solution process indicate a productivity enhancement that, with increasing donor dosage, also indicates an increased heat of fusion of the polymer. The desired donors are those that yield the maximum productivity increase while causing the minimum change to the heat of fusion. Silane donors advantageously meet the criteria most effectively.

Examples 20–31
Effect of Type II Internal Donors

A variety of these catalysts were examined for Type II internal donor characteristics in an attempt to locate a catalyst that produces a smaller amount of the low molecular weight FPO polymers than typical.

Example 20: See Example 2.

Example 21: 30 g MgCl$_2$ and 5.25 g AlCl$_3$ were ball milled (RBM) for 24 h, then 4.46 g (0.0394 mole) cis 2,6-dimethylpiperidine and 4.02 g TiCl$_4$ were added. The mixture was ball milled for another 24 h to give the pro-catalyst.

Example 22: 30 g MgCl$_2$ and 5.25 g AlCl$_3$ were ball milled (RBM) for 24 h, then 5.56 g (0.0393 mole) 2,2,6,6-tetramethylpiperidine and 4.02 g TiCl$_4$ were added. The mixture was ball milled for another 24 h to give the pro-catalyst.

Example 23: 30 g MgCl$_2$ and 5.25 g AlCl$_3$ were ball milled (RBM) for 24 h, then 4.19 mL (0.0394 mole) 2,5-dimethylfuran and 4.02 g TiCl$_4$ were added. The mixture was ball milled for another 24 h to give the pro-catalyst.

Example 24: 30 g MgCl$_2$ and 5.25 g AlCl$_3$ were ball milled (RBM) for 24 h, then 3.95 g (0.0394 mole) 2,5-dimethyltetrafuran and 4.02 g TiCl$_4$ were added. The mixture was ball milled for another 24 h to give the pro-catalyst.

Example 25: 30 g MgCl$_2$ and 5.25 g AlCl$_3$ were ball milled (RBM) for 24 h, then 3.67 g (0.0394 mol) 2-picoline and 4.02 g TiCl$_4$ were added. The mixture was ball milled for another 24 h to give the pro-catalyst.

Example 26: 21.4 g MgCl$_2$ and 3.75 g AlCl$_3$ were ball milled (RBM) for 24 h, then 5.0 g (0.0281 mole) 4-chloroquinaldine and 2.85 g TiCl$_4$ were added. The mixture was ball milled for another 24 h to give the pro-catalyst.

Example 27: 30 g MgCl$_2$ and 5.25 g AlCl$_3$ were ball milled (RBM) for 24 h, then 4.59 mL (0.0394 mole) 2,6-Lutidine and 4.02 g TiCl$_4$ were added. The mixture was ball milled for another 24 h to give the pro-catalyst.

Example 28: 30 g MgCl$_2$ and 5.25 g AlCl$_3$ were ball milled (RBM) for 24 h, then 4.77 g (0.0393 mole) 2,4,6-collidine and 4.02 g TiCl$_4$ were added. The mixture was ball milled for another 24 h to give the pro-catalyst.

Example 29: 30 g MgCl$_2$ and 5.25 g AlCl$_3$ were ball milled (RBM) for 24 h, then 5.0 g (0.0394 mole) 6-chloro-2-picoline and 4.02 g TiCl$_4$ were added. The mixture was ball milled for another 24 h to give the pro-catalyst.

Example 30: 30 g MgCl$_2$ and 5.25 g AlCl$_3$ were ball milled (RBM) for 24 h, then 5.83 g (0.0393 mole) 2,6-dichloropyridine and 4.02 g TiCl$_4$ were added. The mixture was ball milled for another 24 h to give the pro-catalyst.

Example 31: 30 g MgCl$_2$ and 5.25 g AlCl$_3$ were ball milled (RBM) for 24 h, then 9.33 g (0.0394 mol) 2,6-dibromopyridine and 4.02 g TiCl$_4$ were added. The mixture was ball milled for another 24 h to give the pro-catalyst.

These catalysts were used in the polymerization of polypropylene to produce polymers having characteristics set forth in the Tables below:

TABLE III

| Example No.[a] | Donor | Polymn Run No[b] | C.E. g/g-cat.h | $\Delta H_f$ J/g | M.P. °C | MFR g/10 min | MEK Sol % | $M_n \times 10^{-3}$ | $M_w \times 10^{-3}$ | PDI |
|---|---|---|---|---|---|---|---|---|---|---|
| 20 | None | 2536-1 | 16500 | 30 | 154 | 11 | 11 | 21 | 209 | 9.9 |
| 21 | 2,6-dimethylpiperidine | 2536-79 | 7900 | 35.9 | 154.3 | 4.0 | 6.0 | 28 | 239 | 8.47 |

TABLE III-continued

| Example No.[a] | Donor | Polymn Run No[b] | C.E. g/g-cat.h | $\Delta H_f$ J/g | M.P. °C. | MFR g/10 min | MEK Sol % | $M_n \times 10^{-3}$ | $M_w \times 10^{-3}$ | PDI |
|---|---|---|---|---|---|---|---|---|---|---|
| 22 | 2,2,6,6-Tetramethylpiperidine | 2540-51 | 7400 | 51.1 | 156.4 | 0.68 | 5.9 | 33 | 385 | 12.2 |
| 23 | 2,5-dimethylfuran | 2536-76 | 14000 | 35.1 | 154.1 | 6.4 | 8.4 | 27 | 277 | 9.6 |
| 24 | 2,5-dimethyl-tetrahydrofuran | 2536-80 | 14700 | 28.4 | 153.6 | 18.4 | 9.2 | 20 | 201 | 9.9 |
| 25 | 2-picoline | 2540-84 | 13700 | 27.8 | 153.6 | 7.3 | 11.0 | 22 | 214 | 9.7 |
| 26 | 4-chloroquinaldine | 2536-86 | 6500 | 30.2 | 154.4 | 3.6 | 7.6 | 25 | 239 | 9.4 |

[a] - Catalyst general composition: $TiCl_4/MgCl_2/AlCl_3$/Donor, ball milled, Donor/Ti = 1.86.
[b] - Polymerization conditions: 10 mg catalyst; Al/Ti = 200; 60° C. for 1 h.

TABLE IV

| Example No.[a] | Donor | Polymn Run No[b] | C.E. g/g-cat.h | $\Delta H_f$ J/g | M.P. °C. | MFR g/10 min | MEK Sol % | $M_n \times 10^{-3}$ | $M_w \times 10^{-3}$ | PDI |
|---|---|---|---|---|---|---|---|---|---|---|
| 27 | 2,6-Lutidine | 2536-68 | 6800 | 27.5 | 155.0 | 1.4 | 4.8 | 36 | 283 | 7.8 |
| 28 | 2,4,6-collidine | 2540-37 | 9000 | 29.7 | 154.7 | 1.22 | 4.62 | | | |
| 29 | 6-chloro-2-picoline | 2536-83 | 9300 | 27.5 | 154.5 | 1.2 | 3.8 | 36 | 280 | 7.8 |
| 30 | 2,6-dichloropyridine | 2540-35 | 9100 | 26.9 | 154.4 | 3.1 | 8.1 | 32 | 265 | 8.29 |
| 31 | 2,6-dibromopyridine | 2540-86 | 9300 | 27.6 | 153.6 | 2.1 | 8.9 | 29 | 295 | 10.3 |

[a] - Catalyst general composition: $TiCl_4/MgCl_2/AlCl_3$/Donor, ball milled, Donor/Ti = 1.86.
[b] - Polymerization conditions: 10 mg catalyst; Al/Ti = 200; 60° C. for 1 h.

Examples 20–31 illustrate a variety of Type II donors, including aromatic, sterically hindered nitrogen-based Lewis base donors. It was desired to obtain a higher molecular weight indicated by a lower MFR, while having a minimal effect on crystallinity. The results above suggest that: (1) the nitrogen-based donors are generally more effective in increasing molecular weight than oxygen-based donors (Examples 23 and 24, for example); (2) non-aromatic nitrogen-based Lewis bases, e.g., Examples 21 and 22, had a more pronounced effect on polymer heat of fusion than the aromatic derivatives, the latter being weaker Lewis bases; and (3) the steric hindrance around the nitrogen atom importantly appears to increase steric hindrance from 2-picoline to 2,6-lutidine to 2,6-dibromopyridine, with the low molecular weight fractions first decreased, then increased again. 2,6-lutidine and 6-chloro-2-picoline were more effective in reducing the LMW fractions. These polymers are intended for use as the flexible polyolefin polymer component of the various blends of the invention.

Examples 32–44
Combinations of Type I and Type II Donors

A variety of catalysts were prepared and tested to obtain a good productivity, while yielding higher molecular weight and lower crystallinity:

Example 32: 30 g $MgCl_2$ and 5.25 g $AlCl_3$ were ball milled (RBM) for 5 h, 1.55 g (0.0131 mole) $(EtO)SiMe_3$ was added and ball milled for 19 h, then 4.22 g (0.0394 mole) 2,6-Lutidine and 4.02 g $TiCl_4$ were added. The mixture was ball milled for another 24 h to give the pro-catalyst.

Example 33: 30 g $MgCl_2$ and 5.25 g $AlCl_3$ were ball milled (RBM) for 24 hrs., then 3.1 g (0.026 mole) (EtO)$SiMe_3$ and 4.02 g $TiCl_4$ were added. The mixture was ball milled for another 24 hrs. 10 g of this mixture were suspended in 30 mL toluene, to which 33 mL TiCl4 and 0.75 mL (0.0064 mole) 2,6-Lutidine were added. The mixture was stirred at 90° C. for 1 h, then filtered (filtrate orange) and washed with heptane for 3 times to give the yellow pro-catalyst.

Example 34: 30 g $MgCl_2$, 5.25 g $AlCl_3$ and 0.74 g diethoxydimethylsilane were co-ball milled for 24 h, then 1.41 g 2,6-Lutidine and 4.02 g $TiCl_4$ were added. The mixture was ball milled for another 24 h to give the pro-catalyst.

Example 35: 30 g $MgCl_2$, 5.25 g $AlCl_3$ and 0.95 g C-donor were ball milled (RBM) for 24 h, then 1.41 g (0.0131 mol) 2,6-Lutidine and 4.02 g $TiCl_4$ were added. The mixture was ball milled for another 24 h to give the pro-catalyst.

Example 36: 30 g $MgCl_2$, 5.25 g $AlCl_3$ and 1.23 g dicyclopentyldimethoxysilane were ball milled for 24 h, then 1.41 g 2,6-Lutidine and 4.02 g $TiCl_4$ were added. The mixture was ball milled for another 24 h to give the pro-catalyst.

Example 37: 30 g $MgCl_2$, 5.25 g $AlCl_3$ and 1.38 dibutyl phthalate were ball milled for 24 h, then 1.41 g 2,6-lutidine and 4.02 g $TiCl_4$ were added. The mixture was ball milled for another 24 h to give the pro-catalyst.

Example 38: 30 g $MgCl_2$, 5.25 g $AlCl_3$ and 0.95 g C-donor were ball milled (RBM) for 24 h, then 1.66 g (0.0131 mol) 6-chloro-2-picoline and 4.02 g $TiCl_4$ were added. The mixture was ball milled for another 24 h to give the pro-catalyst.

Example 39: 30 g MgCl2, 5.25 g $AlCl_3$ and 0.95 g C-donor were ball milled (RBM) for 24 h, then 3.32 g (0.0262 mol) 6-chloro-2-picoline and 4.02 g $TiCl_4$ were added. The mixture was ball milled for another 24 h to give the pro-catalyst.

Example 40: 5 g of the pro-catalyst in Example 2 was suspended in 100 mL toluene and stirred at 60° C. for 1 h. The solid was filtered out and re-suspended in 30 mL toluene. 16.5 mL $TiCl_4$ and 0.1 mL (0.0005 mole) C-donor were added into the suspension. The mixture was then stirred at 90° C. for 1 h, filtered and washed with heptane then toluene. The solid was re-suspended in 30 mL toluene and mixed with 16.5 mL $TiCl_4$ and 0.41 g (0.0032 mole) 6-chloro-2-picoline. The mixture was brought to reaction at 90° for another hour, then filtered and washed with heptane for 3 times to give the pro-catalyst.

Example 41: 5 g of the pro-catalyst in Example 2 was suspended in 100 mL toluene and stirred at 60° C. for 1 h. The solid was filtered out and re-suspended in 30 mL toluene. 16.5 mL TiCl$_4$ and 0.25 mL (0.001 mole) D-donor were added into the suspension. The mixture was then stirred at 90° C. for 1 h, filtered and washed with heptane twice. The solid was re-suspended in 30 mL toluene and mixed with 16.5 mL TiCl$_4$ and 0.41 g (0.0032 mole) 6-chloro-2-picoline. The mixture was brought to reaction at 90° for another hour, then filtered and washed with heptane for 3 times to give the pro-catalyst.

Example 42: 5 g of the pro-catalyst in Example 2 was suspended in 100 mL toluene and stirred at 60° C. for 1 h. The solid was filtered out and re-suspended in 30 mL toluene. 16.5 mL TiCl$_4$ and 0.1 mL (0.0004 mole) D-donor were added into the suspension. The mixture was then stirred at 90° C. for 1 h, filtered and washed with heptane then toluene. The solid was re-suspended in 30 mL toluene and mixed with 16.5 mL TiCl$_4$ and 0.41 g (0.0032 mole) 6-chloro-2-picoline. The mixture was brought to reaction at 90° for another hour, then filtered and washed with heptane for 3 times to give the pro-catalyst.

Example 43: 30 mg MgCl$_2$ and 5.25 g AlCl$_3$ were ball milled (RBM) for 24 hrs., then 1.55 g (0.013 mole) (EtO)SiMe$_3$ and 4.02 g TiCL were added. The mixture was ball milled for another 24 hrs. 5 g of this mixture was suspended in 100 mL toluene and stirred at 80° C. for 1 h. The solid was filtered out and re-suspended in 30 mL toluene. 16.5 mL TiCl$_4$ and 0.41 g (0.0032 mole) 6-chloro-2-picoline were added into the suspension. The mixture was then stirred at 90° C. for 1 h, filtered and washed with heptane for three times to give the pro-catalyst.

Example 44: 5 g of the mixture of Example 43 was suspended in 100 mL toluene and stirred at 80° C. for 1 h. The solid was filtered out and re-suspended in 30 mL toluene. 16.5 mL TiCl$_4$ and 0.0032 mole 2,6dichloropyridine (dissolved in toluene) were added into the suspension. The mixture was then stirred at 90° C. for 1 h, filtered and washed with heptane for three times to give the pro-catalyst.

These pro-catalysts were used in catalysts for the polymerization of polypropylene to produce flexible polymers having characteristics set forth in the Tables below:

TABLE V

| Example Number | A-type Donor (Donor/Ti) | B-type Donor (Donor/Ti) | Polymn. Run No | C.E. g/g-cat.h | $\Delta H_f$ J/g | M.P. ° C. | MFR g/10 min | MEK Sol % |
|---|---|---|---|---|---|---|---|---|
| 32 (BM) | (EtO)SiMe3 Si/Ti = 0.62 | 2,6-Lutidine N/Ti = 1.86 | 2540-24 | 4500 | 36.8 | 153.5 | 1.2 | 7.1 |
| 33 (solution) | (EtO)SiMe3 Si/Ti nd | 2,6-Lutidine N/Ti nd | 2540-39 | 10900 | 42.6 | 155.3 | 1.3 | 4.4 |
| 34 (BM) | (EtO)2SiMe2 Si/Ti = 0.23 | 2,6-Lutidine N/Ti = 0.62 | 2541-53 | 14300 | 36.6 | 154.2 | 1.9 | 7.2 |
| 35 (BM) | C-donor Si/Ti = 0.23 | 2,6-Lutidine N/Ti = 0.62 | 2540-91 | 15500 | 28.3 | 152.9 | 1.6 | 8.0 |
| 36 (BM) | D-donor Si/Ti = 0.23 | 2,6-Lutidine N/Ti = 0.62 | 2541-51 | 14000 | 38.3 | 154.5 | 1.3 | 5.3 |
| 37 (BM) | Dibutyl phthalate DBP/Ti = 0.23 | 2,6-Lutidine N/Ti = 0.62 | 2541-23 | 10500 | 32.9 | 154.5 | nd | 7.4 |
| 38 (BM) | C-donor Si/Ti = 0.23 | 6-chloro-2-picoline N/Ti = 0.62 | 2540-96 | 14700 | 29.6 | 153.7 | 3.1 | 7.4 |

BM = ball milling

TABLE VI

| Example No. | A-type Donor (Donor/Ti) | B-type Donor (Donor/Ti) | Polymn. Run No | C.E. g/g-cat.h | $\Delta H_f$ J/g | M.P. ° C. | MFR g/10 min | MEK Sol % |
|---|---|---|---|---|---|---|---|---|
| 39 (BM) | C-donor Si/Ti = 0.23 | 6-chloro-2-picoline N/Ti = 1.24 | 2540-98 | 10500 | 27.8 | 153.8 | 1.2 | 7.0 |
| 40 (solution) | C-donor Si/Ti n.d. | 6-chloro-2-picoline N/Ti n.d. | 2540-77 | 9300 | 26.7 | 154.1 | 1.0 | 6.5 |
| 41 (solution) | D-donor Si/Ti n.d | 6-chloro-2-picoline N/Ti n.d. | 2540-53 | 15700 | 29.7 | 153.3 | 1.8 | 5.7 |
| 42 (solution) | D-donor Si/Ti n.d. | 6-chloro-2-picoline N/Ti n.d. | 2540-67 | 9700 | 28.1 | 155.0 | 1.7 | 5.7 |
| 43 (solution) | (EtO)SiMe3 Si/Ti n.d. | 6-chloro-2-picoline N/Ti n.d. | 2540-47 | 8300 | 35.7 | 155.4 | 1.0 | 6.8 |
| 44 (solution) | (EtO)SiMe3 Si/Ti n.d. | 2,6-dichloropyridine N/Ti n.d. | 2540-49 | 19100 | 36.1 | 154.1 | 4.2 | 6.9 |

BM = ball milling

The goal of Examples 32–44 was to obtain a catalyst with good productivity, while yielding higher molecular weight and lower crystallinity. Examples 32–44 illustrate the combinations of these donors by both ball mill and solution process. It appeared that the most promising combinations are those between C-donor, D-donor and 2,6-Lutidine, 6-chloro-2-picoline. D-donor and 2,6-Lutidine seemed to cause slightly higher heat of fusion. Also, the solution process appeared less advantageous as compared to the ball mill process.

Example 53: 30 g $MgCl_2$, 5.25 g $AlCl_3$ and 1.43 g C-donor were ball milled (RBM) for 24 h, then 1.41 g (0.0131 mol) 2,6-Lutidine and 4.02 g $TiCl_4$ were added. The mixture was ball milled for another 24 h to give the pro-catalyst.

These pro-catalysts were used in catalysts for the polymerization of polypropylene to produce polymers having characteristics set forth in the Table below:

TABLE VII

| Example No. | Ti % | C-donor (Si/Ti) | 2,6-Lutidine (N/Ti) | Polymn. Run No | C.E. g/g-cat.h | $\Delta H_f$ J/g | M.P. °C. | MFR g/10 min | MEK Sol % | $M_n$ × $10^{-3}$ | $M_w$ × $10^{-3}$ | PDI |
|---|---|---|---|---|---|---|---|---|---|---|---|---|
| 45 | 2.33 | 0 | 1.56 | 2540-1 | 6400 | 31.8 | 154.8 | 1.5 | 6.8 | 36 | 283 | 7.75 |
| 46 | 2.41 | 0 | 1.24 | 2540-71 | 8800 | 27.4 | 154.2 | 1.6 | 7.2 | 40 | 299 | 7.45 |
| 47 | 2.50 | 0 | 0.62 | 2540-75 | 12700 | 27.3 | 153.4 | 1.9 | 6.9 | 32 | 273 | 8.4 |
| 48 | 2.54 | 0 | 0.32 | 2540-82 | 15900 | 29.5 | 152.6 | 3.2 | 10.1 | 26 | 247 | 9.41 |
| 49 | 4.54 | 0 | 0.31 | 2540-80 | 12600 | 32.7 | 154.6 | 1.9 | 6.6 | 31 | 242 | 7.74 |
| 50 | 4.47 | 0.118 | 0.31 | 2540-89 | 15100 | 38.8 | 154.0 | 2.4 | 5.5 | 36 | 263 | 7.37 |
| 51 | 2.47 | 0.118 | 0.62 | 2541-6 | 14300 | 29.5 | 153.6 | 2.3 | 8.0 | | | |
| 52 | 2.44 | 0.23 | 0.62 | 2540-91 | 15500 | 28.3 | 152.9 | 1.6 | 8.0 | 32 | 274 | 8.48 |
| 53 | 2.41 | 0.35 | 0.62 | 2541-8 | 15000 | 37.1 | 153.5 | 1.8 | 5.9 | | | |

Examples 45–53
Optimization of Catalyst Formulation With C-donor (Type I) and 2,6-Lutidine (Type II)

Likely candidates for catalysts having all desired properties were selected to optimize all characteristics in the catalyst and resulting FPO polymer:

Example 45: 30 g $MgCl_2$ and 5.25 g $AlCl_3$ were ball milled (RBM) for 24 h, then 4.59 mL (0.0394 mole) 2,6-Lutidine and 4.02 g $TiCl_4$ were added. The mixture was ball milled for another 24 h to give the pro-catalyst.

Example 46: 30 g $MgCl_2$ and 5.25 g $AlCl_3$ were ball milled (RBM) for 24 h, then 2.81 g (0.0262 mol) 2,6-Lutidine and 4.02 g $TiCl_4$ were added. The mixture was ball milled for another 24 h to give the pro-catalyst.

Example 47: 30 g $MgCl_2$ and 5.25 g $AlCl_3$ were ball milled (RBM) for 24 h, then 1.41 g (0.0131 mol) 2,6-Lutidine and 4.02 g $TiCl_4$ were added. The mixture was ball milled for another 24 h to give the pro-catalyst.

Example 48: 30 g $MgCl_2$ and 5.25 g $AlCl_3$ were ball milled (RBM) for 24 h, then 0.74 g (0.0069 mol) 2,6-Lutidine and 4.02 g $TiCl_4$ were added. The mixture was ball milled for another 24 h to give the pro-catalyst.

Example 49: 30 g $MgCl_2$ and 5.25 g $AlCl_3$ were ball milled (RBM) for 24 h, then 1.41 g (0.0131 mol) 2,6-Lutidine and 8.04 g $TiCl_4$ were added. The mixture was ball milled for another 24 h to give the pro-catalyst.

Example 50: 30 g $MgCl_2$, 5.25 g $AlCl_3$ and 0.95 g C-donor were ball milled (RBM) for 24 h, then 1.41 g (0.0131 mol) 2,6-Lutidine and 8.04 g $TiCl_4$ were added. The mixture was ball milled for another 24 h to give the pro-catalyst.

Example 51: 30 g $MgCl_2$, 5.25 g $AlCl_3$ and 0.48 g C-donor were ball milled (RBM) for 24 h, then 1.41 g (0.0131 mol) 2,6-Lutidine and 4.02 g $TiCl_4$ were added. The mixture was ball milled for another 24 h to give the pro-catalyst.

Example 52: 30 g $MgCl_2$, 5.25 g $AlCl_3$ and 0.95 g C-donor were ball milled (RBM) for 24 h, then 1.41 g (0.0131 mol) 2,6-Lutidine and 4.02 g $TiC_4$ were added. The mixture was ball milled for another 24 h to give the pro-catalyst.

Examples 45–53 illustrate the optimization of donor dosage by locating a point where the MFR is sufficiently low, but catalyst productivity is acceptably high for polymerization, as well as the optimization of maintaining improved productivity while obtaining low heat of fusion. Example 52 appears as the pro-catalyst advantageously having the optimum recipe, with a relatively high productivity of 15,500 g/g catalyst, relatively low $H_f$ of about 28.3 J/g, and significantly lower MFR of about 1.6 g/10 min. than for other catalyst formulations.

Example 54
Method for Preparation of a Preferred Catalyst 120 lbs. of solid magnesium chloride ("$MgCl_2$") and 21 lbs. of solid aluminum chloride ("$AlCl_3$") were charged to a 250 L vibratory ball mill and mixed for about 15 minutes. Then, 3.8 lbs. of cyclohexylmethyldimethoxysilane was sprayed into the stainless steel container. Alternatively, the silane could have been added with the other two components before ball milling. The mixture was then ball milled for 16 hours at room temperature.

Subsequent to the initial ball milling, 3.7 lbs. of liquid 2,6-lutidine and 16.1 lbs. of liquid titanium tetrachloride ($TiCl_4$) were added to the mixture. An alternative heterocyclic aromatic amine, such as about 4.5 lbs. of liquid 6-chloro-2-picoline could instead have been substituted. The lutidine was directly added to these components, although spray addition of the two liquid components into the existing mixture over about two to three hours would also be suitable. The five (5) components were then ball milled for about an additional 16 hours. The ball milling involves vibrating steel balls to pound the component particles, imparting heat to the ball milling vessel; however, the vessel was temperature controlled to maintain approximately room temperature during the ball milling.

In the preparation of a variety of FPO polymers, the productivity of the present catalyst has ranged from about a 30 to 55 percent increase, compared to conventional catalysts.

Examples 55–62
Pilot Plant Continuous Process

Flexible polyolefin polymers were prepared in a large scale continuous pilot plant operation, wherein monomers, hydrogen, and catalyst components were separately and continuously charged to a stirred reactor. The total monomer feed rate corresponded to about a 1.8 hour residence time in the reactor. Triethylaluminum ("TEA") and external modifier cyclohexylmethyldimethoxysilane ("CMDS") were pumped into the reactor as about 5 weight percent and 0.25 weight percent heptane solutions, respectively. The solid catalyst component had a titanium content of about 2.2 weight percent and was prepared according to Example 54. The solid catalyst component was pumped into the reactor as a 25 weight percent mixture in petrolatum. The catalyst components were added at rates directly proportional to the polymer production rates, and in amounts sufficient to maintain the polymer solids concentration in the reactor slurry at values typically in the range of about 30 to 50 weight percent. The catalyst productivity (lbs polymer/lb solid catalyst) was calculated from the polymer solids withdrawal rate and the solid catalyst component addition rate. The product polymers were separated from unreacted monomers, deactivated, stabilized, and pelletized, followed by testing to determine polymer characteristics. The Table below sunnarizes the pertinent operating conditions and results of the physical testing of the polymer characteristics.

TABLE VIII

| Example | 55 | 56 | 57 | 58 | 59 | 60 | 61 | 62 |
|---|---|---|---|---|---|---|---|---|
| Reactor Temp ° F. | 135 | 135 | 135 | 135 | 135 | 135 | 140 | 140 |
| Propylene (lbs/hr) | 138 | 154 | 136 | 146 | 142 | 147 | 147 | 135 |
| Ethylene (lbs/hr) | — | — | 1.5 | 1.1 | — | — | — | — |
| Hydrogen (lbs/hr) | — | 0.028 | — | 0.028 | 0.026 | 0.040 | 0.027 | 0.04 |
| Solid catalyst (lbs/hr) | 0.0045 | 0.0038 | 0.0029 | 0.0026 | 0.0045 | 0.0048 | 0.0055 | 0.0046 |
| Al/Ti mol ratio | 162 | 210 | 256 | 364 | 155 | 184 | 161 | 191 |
| CMDS/Ti mol ratio | — | — | — | — | 0.77 | 0.87 | 2 | 2 |
| Productivity (lbs/hr) | 9880 | 11600 | 16110 | 16890 | 9630 | 10420 | 8480 | 10090 |
| Ethylene - wt % | — | — | 2.2 | 2.6 | — | — | — | — |
| $\Delta H_f$ (J/g) | 26.6 | 23.8 | 17.8 | 18.2 | 33.5 | 36.1 | 50.4 | 53.4 |
| MFR (g/10 min) | 4.6 | 13.6 | 4.9 | 15.8 | 7.4 | 30 | 4.8 | 25.9 |
| Tensile Modulus (kpsi) | 11 | 9 | 5 | 3 | 20 | 20 | 40 | 43 |
| Tensile stress @ 311% strain-psi | 1330 | 935 | 983 | 660 | 1400 | 1087 | 2100 | 1720 |
| % Tensile set, 0/24 hr | 36/23 | 34/19 | 31/17 | 30/17 | 46/31 | 45/29 | 63/45 | 69/50 |
| VICAT softening (° C.) | 58 | 46 | 41 | 42 | 66 | 57 | 95 | 97 |
| Shore D Hardness | 46 | 45 | 38 | 34 | 51 | 50 | 61 | 62 |

Examples 63–71
Preparation of Various Polymers

The polymerization of several FPO polymers, which are by no means indicative of the broad scope of polymers this invention is meant to encompass, was examined using the ball-milled catalyst of the present invention. The characteristics of some of these polymers are set forth below:

TABLE IX

| Example No. | 63 | 64 | 65 | 66 | 67 | 68 | 69 | 70 | 71 |
|---|---|---|---|---|---|---|---|---|---|
| Pro-cat., mg | 10 | 10 | 10 | 10 | 10 | 10 | 10 | 10 | 10 |
| Co-catalyst | TEA | TEA | TEA | TEA | TEA | TEA | TEA | TEA | TEA |
| Al/Ti, mol/mol | 200 | 200 | 200 | 200 | 200 | 200 | 200 | 200 | 200 |
| Modifier | | CMDS | | CMDS | | | | | |
| Modifier/Ti, mol/mol | | 1 | | 1 | | | | | |
| $H_2$, psig | 0 | 0 | 5 | 5 | 0 | 0 | 0 | 0 | 0 |
| Ethylene, g/min[a] | 0 | 0 | 0 | 0 | 0.27 | 0 | 0 | 0 | 0 |
| Propylene, mL | 660 | 660 | 660 | 660 | 660 | 610 | 460 | 610 | 460 |
| 1-butene, mL | 0 | 0 | 0 | 0 | 0 | 50 | 200 | 0 | 0 |
| 1-pentene, mL | 0 | 0 | 0 | 0 | 0 | 0 | 0 | 50 | 200 |
| C.E. g/g cat/h | 15300 | 10400 | 17500 | 13100 | 19600 | 11000 | 10600 | 9400 | 8000 |
| H.F., J/g | 32.2 | 57.2 | 34.8 | 62.7 | 25.6 | 21.8 | 13.8 | 21.9 | 6.6 |
| m.p, ° C. | 153.7 | 156.4 | i55.9 | 158.3 | 146.7 | 137.3 | 109.7 | 141.0 | 126.9 |
| MFR, g/10 min | 2.16 | 0.3 | 12.0 | 21.9 | 2.24 | 4.i | 6.3 | 4.4 | 10.2 |

Batch polymerization in 1 liter autoclave, 60° C., for 1 hr.
[a] Ethylene continuously fed during 1 hour reaction time.

Examples 72–83
Preparation of Various Copolymers

Each of the FPO polymer products in Examples 72 to 83 set forth in the Table below were prepared in general by the process described in the Examples above. Initially, a clean one-Liter stainless steel autoclave reactor equipped with an agitator was purged with nitrogen to remove impurities. Next, triethylaluminum is added to the reactor in sufficient quantity to provide an Al:Ti atomic ratio of about 200:1 when followed by addition of a mineral oil suspension containing about 10 mg of solid procatalyst as described herein. The mixed monomer charges, which include 660 mL liquid volume, were subsequently introduced into the reactor at an effective pressure and under thermal control to maintain a reaction temperature of 60° C. for one hour. The "C" and "D" donors were those used previously. After one hour, the unreacted monomer was vented off and the polymer product was recovered using conventional techniques. The characteristics of some of these FPO polymer products are set forth below:

TABLE X

| Example No. | 72 | 73 | 74 | 75 | 76 | 77 | 78 | 79 | 80 | 81 | 82 | 83 |
|---|---|---|---|---|---|---|---|---|---|---|---|---|
| Propylene, mL | 640 | 610 | 560 | 460 | 640 | 610 | 560 | 460 | 640 | 610 | 560 | 460 |
| 1-butene, mL | 20 | 50 | 100 | 200 | 0 | 0 | 0 | 0 | 0 | 0 | 0 | 0 |
| 1-pentene, mL | 0 | 0 | 0 | 0 | 20 | 50 | 100 | 200 | 0 | 0 | 0 | 0 |
| 1-octene, mL | 0 | 0 | 0 | 0 | 0 | 0 | 0 | 0 | 20 | 50 | 100 | 20 |
| C.E. g/g-cat/h | 13200 | 11000 | 10600 | 10700 | 13000 | 10400 | 10300 | 8000 | 12600 | 12200 | 12300 | 11000 |
| wt % $C_{4-8}$ [a] | 1.8 | 5.9 | 11.4 | 28.7 | 3.5 | 4.2 | 8.9 | 26.4 | 1.2 | 3.0 | 8.5 | 13.8 |
| $n_{C_3}$ [b] | 69.7 | 21.8 | 11.3 | 4.6 | 65.7 | 39.8 | 19.5 | 8.0 | 186.2 | 84.7 | 32.7 | 17.4 |
| $n_{C_{4-8}}$ [c] | — | 1.1 | 1.1 | 1.4 | — | — | 1.1 | 1.6 | — | — | — | 1.1 |
| H.F., J/g | 28.3 | 25.4 | 18.3 | 7.4 | 23.9 | 18.4 | 16.9 | 10.4 | 26.2 | 24.0 | 19.9 | 14.3 |
| m.p., ° C. | 149.0 | 136.6 | 131.6 | 110.1 | 146.5 | 139.9 | 132.5 | 130.0 | 150.5 | 147.2 | 144.2 | 144.4 |
| $T_g$, ° C. | −1.5 | −3.0 | −5.1 | −9.9 | −2.1 | −3.4 | −3.9 | −6.8 | −2.8 | −3.0 | −5.6 | −11.9 |
| MFR, g/10 min | 3.2 | 4.0 | 2.8 | 6.6 | 3.8 | 5.0 | 6.8 | 10.2 | 2.9 | 3.8 | 5.3 | 8.9 |
| Density, g/cm³ | 0.873 | 0.865 | 0.869 | 0.864 | 0.871 | 0.868 | 0.866 | 0.856 | 0.87 | 0.874 | 0.866 | 0.863 |
| MEK sol % | 8.1 | 6.8 | 5.2 | 4.6 | 8.0 | 7.2 | 8.2 | 6.1 | 7.6 | 8.1 | 7.4 | 7.1 |

Batch polymerization in 1 liter autclave. Catalyst 10 mg; TEA/Ti 200; Total liquid monomer charge 660 mL; 60° C; 1 hr.
[a] weight percentage of co-monomer incorporation.
[b] Number average sequence length for propylene units.
[c] Number average sequence length for co-monomer units.

Examples 84–99
Ethylene Co-monomer Polymers

The following examples illustrate various types of FPO polymers produced according to the present invention by using relatively higher amounts of ethylene and at least one other co-monomer as a monomeric raw material. Values in the "Enthalpy" column in the various charts are shown as a positive and a negative energy value, since the leftmost value is heat of fusion and the rightmost value is heat of crystallinity. It should also be understood that all the FPO polymers discussed herein may be used in any of the various blends, threads, products, and methods of the invention.

TABLE XI

HIGHER ETHYLENE FPO PRODUCTS

| EXAMPLE NO. | 84 | 85 | 86 | 87 | 88 | 89 | 90 | 91 | 92 | 93 |
|---|---|---|---|---|---|---|---|---|---|---|
| LOT Melt Flow, g/10 min @ 230° C. | 5.3 | 5 | 5.8 | 5.7 | 5.5 | 5.3 | 4.7 | 5 | 5.5 | 5.2 |
| Ethylene Content, wt % | 2.2 | 3.8 | 5.7 | 7.3 | 9.7 | 9.6 | 14.8 | 17.7 | 15 | 16 |
| DSC $M_p/F_p$ (° C.) | 147.2/93.8 | 144.5/92.2 | 136.6/88.1 | 132.0/85.3 | 127.6/84.4 | 127.9/84.5 | 123.3/80.9 | 118.9/77.6 | 120.5/77.7 | 114.9/73.5 |
| Enthalpy (J/g) | 17.5/21.6 | 14/−19.7 | 14.1/−13.1 | 11.5/−12.6 | 7.9/−10.6 | 8.1/−9.6 | 5.7/−7.7 | 4/−4.4 | 5.2/−6.8 | 4.5/4.9 |
| Density, g/cm³ | — | — | 0.8683 | — | — | 0.8597 | — | 0.8446 | — | — |
| DSC $T_g$, ° C. | — | −6.7 | −9.3 | −16.2 | — | −17.7 | −24.1 | −26.1 | — | — |
| MEK Solubles, wt % | 9.03 | 9.42 | 7.89 | 7.67 | 7.07 | 6.77 | 6.8 | 7.2 | — | — |
| Diethyl Ether Sol., wt. | 31.5 | 35.9 | 41.5 | 45.2 | 47 | 45.5 | 48.2 | 47.4 | — | — |
| Hexane Sol. wt % | 39.5 | 45.6 | 51.8 | 62.6 | 70.5 | 68.6 | 77.3 | 81.6 | 80.6 | 82.3 |
| Shore Hardness, A/D scales | 377– | 337– | 28/85 | 25/81 | 20/75 | 20/76 | 15/67 | 12/61 | 15/66 | 12/62 |
| Shrinkage Test: | | | | | | | | | | |
| Length (in/in) | — | 0.0363 | — | — | — | 0.0669 | — | 0.0838 | — | — |
| Width (in/in) | — | 0.0016 | — | — | — | 0.0078 | — | 0.0065 | — | — |
| Molecular Weight Measures: | | | | | | | | | | |
| GPC | | | | | | | | | | |
| Mn (×1000) | 27 | 26 | 27 | 27 | 27 | 27 | 27 | 28 | 32 | 27 |

TABLE XI-continued

HIGHER ETHYLENE FPO PRODUCTS

| EXAMPLE NO. | 84 | 85 | 86 | 87 | 88 | 89 | 90 | 91 | 92 | 93 |
|---|---|---|---|---|---|---|---|---|---|---|
| Mw (×1000) | 219 | 221 | 222 | 224 | 222 | 226 | 218 | 207 | 219 | 203 |
| Mz (×1000) | 792 | 836 | 873 | 889 | 905 | 916 | 968 | 850 | 857 | 821 |
| PDI | 8.1 | 8.5 | 8.22 | 8.3 | 8.22 | 8.4 | 8.1 | 7.4 | 6.8 | 7.5 |
| I.V. of neat polymer, dl/g | 1.48 | 1.96 | 1.24 | 1.63 | 1.25 | 1.67 | 1.37 | 1.23 | — | — |
| I.V. of ether soluble fraction, dl/g | 0.826 | 0.87 | 0.61 | 0.82 | 0.87 | 0.79 | 0.9 | 0.91 | — | — |
| Cast Film 1 mil by 6 inches: | | | | | | | | | | |
| Measured Thickness (mil) | 1.6–2.1 | — | 1.6–1.7 | — | — | 1.3 | — | 1.7–1.8 | — | — |
| Machine Direction: | | | | | | | | | | |
| Stress @ Yield (psi) | 733 | — | NY | — | — | NY | — | NY | — | — |
| Stress @ Break (psi) | 1761 | — | 1468 | — | — | 1052 | — | 870 | — | — |
| Strain @ Break (%) | 549 | — | 568 | — | — | 415 | — | 656 | — | — |
| Transverse Direction: | | | | | | | | | | |
| Stress @ Yield (psi) | 539 | — | 401 | — | — | NY | — | NY | — | — |
| Stress @ Break (psi) | NB(989) | — | NB(728) | — | — | NB(516) | — | NB(226) | — | — |
| Strain @ Break (%) | NB(>700) | — | NB(>700) | — | — | NB(>700) | — | NB(>700) | — | — |
| Tensile Modulus (kpsi) | 5.1 | 3.8 | 2.6 | 2.2 | 1.6 | 1.6 | 1.2 | 0.87 | 1.11 | 0.88 |
| Tensile Strain at Yield (%) | NY | NY | NY | NY | NY | NY | NY | NY | NY | NY |
| Tensile Strain at Yield (psi) | NY | NY | NY | NY | NY | NY | NY | NY | NY | NY |
| Tensile Strain at Break (%) | NB | NB | NB | NB | NB | NB | NB | NB | NB | NB |
| Tensile Strain at Break (psi) | NB | NB | NB | NB | NB | NB | NB | NB | NB | NB |
| Tensile Strain at Max. Stain (311%) (psi) | 936 | 844 | 699 | 626 | 550 | 547 | 359 | 270 | 354 | 291 |
| Tensile Set after 300% Extension (%) (0/24 h) | 31/16 | 30/17 | 30/15 | 29/15 | 29/13 | 29/13 | 35/13 | 38/13 | 36/14 | 36/13 |
| VICAT Softening Temperature (° C.) | 40 | 40 | 40 | 39 | 43 | 43 | 23 | 23 | 23 | 23 |
| Melt Swell Ratio (210° C./5 kg) | 1.502 | 1.52 | 1.55 | 1.566 | 1.524 | 1.536 | 1.486 | 1.49 | 1.498 | 1.46 |
| Zero-Shear Viscosity (Pa-s) | 9675 | 8823 | 8312 | 8796 | 8456 | 8624 | 8713 | 7945 | 7984 | 7740 |
| Crossover Modulus (Pa) | 22044 | 22277 | 22461 | 22800 | 24509 | 24638 | 29304 | 31881 | 29641 | 30252 |
| PDI = 100,000/Gc | 4.54 | 4.49 | 4.45 | 4.38 | 4.08 | 4.06 | 3.41 | 3.14 | 3.37 | 3.31 |
| Crossover Frequency, rad/s | 21.09 | 23.2 | 25.6 | 25.13 | 27.75 | 27.99 | 34.04 | 40.21 | 37.17 | 39.79 |

TABLE XII

HIGHER ETHYLENE FPO PRODUCTS WITH DONOR ADDED

| EXAMPLE NO. | 94 | 95 | 96 | 97 | 98 | 99 |
|---|---|---|---|---|---|---|
| LOT Melt Flow, g/10 min. @ 230° C. | 5.5 | 8.4 | 4 | 4.8 | 5.6 | 6.9 |
| Ethylene Content, wt % | 9.7 | 6.2 | 14.7 | 12.6 | 9.8 | 9.8 |
| DSC $M_p/F_p$ (° C.) | 132.2/86.6 | 136.3/93/1 | 121.9/81.1 | 126/84.6 | 130.8/88.8 | 130.8/87.5 |
| Enthalpy (J/g) | 27.3/−30.7 | 23/−24.7 | 14.6/−19.4 | 17.8/20.3 | 21/−18.9 | 29.4/−30.7 |
| Density, g/cm³ | 0.874 | 0.878 | | | | |
| MEK Solubles, wt % | 4.96 | 6.31 | 3.4 | — | — | — |
| Diethyl Ether Sol., wt % | 23 | 27.7 | 29.5 | — | — | — |
| Shrinkage Test: | | | | | | |
| Length (in/in) | — | 0.0125 | 0.0181 | — | 0.0131 | 0.0125 |
| Width (in/in) | — | 0.0137 | 0.0143 | — | 0.0133 | 0.0136 |
| I.V. of neat polymer, dl/g | 1.9 | 1.3 | 1.65 | — | — | — |
| I.V. of ether soluble fraction, dl/g | 0.57 | 0.37 | 0.8 | — | — | — |
| Cast Film 1 mil by 6 inches: | | | | | | |
| Measured Thickness (mil) | 1.4–1.5 | 1.4–1.7 | 1.4–1.5 | — | — | — |
| Machine Direction | | | | | | |
| Stress @ Yield (psi) | 1047 | 959 | 1356 | — | — | — |
| Stress @ Break (psi) | 2760 | 2043 | 552 | — | — | — |
| Strain @ Break (%) | 538 | 653 | — | — | — | — |
| Tranverse Direction | | | | | | |
| Stress @ Yield (psi) | 733 | 774 | 566 | — | — | — |
| Stress @ Break (psi) | NB(1500) | NB(1510) | NB(1190) | — | — | — |
| Strain @ Break (%) | NB | NB | NB | — | — | — |

Examples 100–104
Blends for Non-woven Applications

Several polymer blends were prepared that are useful in non-woven products or composites according to the invention. All of the tradename polymers discussed in these examples below are commercially available from Huntsman Polymers Corporation of 2502 S. Grandview Avenue, Odessa, Tex. The preparation of these useful blends is described below.

Example 100 was prepared by blending 28 pounds of W209, produced in accordance with Example 88 with a copolymer containing 10 weight percent ethylene, with 72 pounds of RT 2780.

Example 101 was prepared by blending 15 pounds of W201, a random polypropylene copolymer having 2 weight percent ethylene, with 85 pounds of E-21.

Example 102 was prepared by blending 10 pounds of W110 propylene homopolymer with 90 pounds of RT2780.

Example 103 was prepared by blending 10 pounds of W209 with 90 pounds of E-21.

Example 104 was prepared by blending 65 pounds of RT2780 with 35 pounds of W209.

Examples 105–108
Preferred Blends for Use as Adhesives

Several polymer blends were prepared for use as adhesives and in the composite non-woven products including adhesives according to the invention. All of the tradename polymers discussed in these examples below are commercially available from Huntsman Polymers Corporation of 2502 S. Grandview Avenue, Odessa, Tex.

TABLE XIII

Physical properties of the APAO/FPO blend

| PHYSICAL PROPERTIES A.R.#: 13868 | Ex. 105: RT 2780 + 28% W209 | Ex. 106: RT2780 + 10% W110 | Ex. 107: E21 + 15% W201 | Ex. 108: E21 + 12% W209 |
|---|---|---|---|---|
| Tensile Modulus (kpsi) | 2.5 | 2.7 | 15.2 | 14 |
| Tensile Strain at Yield (%) | 32 | 15 | 10 | 11 |
| Tensile Stress at Yield (psi) | 99 | 72 | 439 | 420 |
| Tensile Strain at Break (%) | 258 | 40 | 42 | 30 |
| Tensile Stress at Break (psi) | 101 | NA | 312 | 363 |
| Shore Hardness (A/D) | 69/16 | 70/15 | 96/35 | 95/32 |
| Melt Viscosity (centipoise) | 115,000 | 12,500 | 16,500 | 17,500 |
| Needle Penetration (dmm) | 16 | 13 | 5 | 8 |
| Open time (sec) | 10 | 30 | 90 | 50 |
| Ring and ball softening point (° F.) | 275 | 239 | 267 | 223 |

The polymer blends set forth in the Table above have suitably high adhesiveness, as measured by the open time and ring and ball softening point.

Examples 109–119
LMW Ethylene/Propylene Copolymer Blended with HMW Propylene

LMW APAO ethylene/propylene copolymer was blended with low crystallinity, HMW APAO propylene (FPD designation) to form certain polymer blends of the present invention. The REXTAC® 2385 is a LMW APAO of about 7.5 weight percent ethylene and 92.5 weight percent propylene. FPD-100 HMW APAO has a heat of fusion of approximately 23–27 J/g. FPD400 HMW APAO has a heat of fusion of approximately 17–20 J/g. FPD-2300 HMW APAO has a heat of fusion of approximately 33–37 J/g. The heats of fusion are provided as ranges, because they vary slightly depending upon the determination method. The characteristics of a LMW APAO polymer (Example 109) and various LMW APAO and HMW APAO polymer blends of the invention (Examples 110–119) are set forth in Table XIV below.

The blends are useful in the composites and adhesive compositions of the invention.

TABLE XIV

Physical and Mechanical Properties of High Melt Viscosity Ethylene/Propylene APAOs

| Polymer type (wt %) | MV (cPs) mPa × s | NP (dmm) | R & B SP ° C. (° F.) | OT (sec) | Tens. Mod. MPa (psi) | Tens. Strain @ Break (%) | $T_g$ (° C.) | H.F. (° C.) | mp (° C.) |
|---|---|---|---|---|---|---|---|---|---|
| 100% REXTAC® 2385 | 8,500 | 20 | 141 (285) | 20 | 6.9 (1000) | 55 | −29 | <5 | 139 |
| 97.5% 2385/ 2.5% FPD-400 | 10,800 | 21 | 141 (286) | 10 | (1000) | 56 | −20 | 6.8 | 140.4 |
| 92.5% 2385/ 7.5% FPD-400 | 21,000 | 18 | 142 (288) | 10 | 7.6 (1100) | 45 | −20 | 7 | 142.4 |
| 85% 2385/ 15% FPD-400 | 50,800 | 17 | 149 (300) | 10 | (1600) | 150 | −20 | 12.1 | 140.3 |

TABLE XIV-continued

Physical and Mechanical Properties of High Melt Viscosity Ethylene/Propylene APAOs

| Polymer type (wt %) | MV (cPs) mPa × s | NP (dmm) | R & B SP °C. (°F.) | OT (sec) | Tens. Mod. MPa (psi) | Tens. Strain @ Break (%) | $T_g$ (°C.) | H.F. (°C.) | mp (°C.) |
|---|---|---|---|---|---|---|---|---|---|
| 80% 2385/ 20% FPD-400 | 81,000 | 17 | 149 (301) | 10 | (1600) | 125 | −19 | 14.3 | 140.1 |
| 85% 2385/ 15% FPD-100 | 51,000 | 17 | 149 (300) | 10 | 11.0 (1600) | 150 | −20 | 12 | 141.2 |
| 80% 2385/ 20% FPD-100 | 81,000 | 17 | 149 (301) | 10 | 11.0 (1600) | 125 | −20 | 14 | 136.5 |
| 97.5% 2385/ 2.5% FPD-2300 | 12,400 | 28 | 138 (280) | 10 | (1780) | 60 | — | 5.9 | 140.6 |
| 90% 2385/ 10% FPD-2300 | 37,300 | 18 | 151 (304) | 10 | (1700) | 87 | — | 11.2 | 145.6 |
| 80% 2385/ 20% FPD-2300 | 165,000 | 14 | 158 (316) | 0 | 23.4 (3400) | 120 | −19 | 19 | 152.4 |
| 65% 2385/ 35% FPD-400 | 205,000 | 10 | 158 (316) | 0 | 15.2 (2200) | 265 | −18 | 14 | 145 |

Examples 120–127
LMW 1-Butene/Propylene Blended with HMW Propylene

LMW APAO 1-butene/propylene copolymer was blended with low crystallinity, H,MW APAO propylene (FPD designation) to form certain polymer blends of the present invention. The REXTAC® 2780 is a LMW APAO of about 35 weight percent 1-butene and 65 weight percent propylene copolymer. The FPD-100, −400, and −2300 have heats of fusion as discussed above. The characteristics of a LMW APAO 1-butene/propylene copolymer (Example 120) and various LMW APAO and HMW APAO polymer blends of the invention (Examples 121–127) are set forth in the Table below.

These blends are useful in the composites and adhesive compositions of the invention.

Examples 128–34
LMW 1-Butene/Propylene Blended with HMW Propylene

LMW APAO 1-butene/propylene copolymer was blended with low crystallinity, HMW APAO propylene (FPD designation) to form certain polymer blends of the present invention. The E21 polymer is a LMW APAO of about 65 weight percent 1-butene and 35 weight percent propylene copolymer. The FPD-100, −400, and −2300 have heats of fusion as discussed above. The characteristics of a LMW APAO 1-butene/propylene copolymer (Example 128) and various LMW APAO and HMW APAO polymer blends of the invention (Examples 129–134) are set forth in Table XVI below.

These blends are useful in the composites and adhesive compositions of the invention.

TABLE XV

Physical and Mechanical Properties of High Melt Viscosity 1-Butene/Propylene APAOs

| Polymer type (wt %) | MV (cPs) mPa × s | NP (dmm) | R & B SP °C. (°F.) | OT (sec) | Tens. Mod. MPa (psi) | Tens. Strain @ Break (%) | $T_g$ (°C.) | H.F. (°C.) | mp (°C.) |
|---|---|---|---|---|---|---|---|---|---|
| 100% REXTAC® 2780 | 8,000 | 25 | 107 (225) | 240 | 3.5 (500) | 130 | −23 | <2 | 83 |
| 97.5% 2780/ 2.5% FPD-400 | 11,200 | 33 | 111 (232) | 210 | (1200) | 106 | −19 | <2 | 89.8 |
| 92.5% 2780/ 7.5% FPD-400 | 16,000 | 32 | 123 (254) | 160 | 6.2 (900) | 81 | −19 | <2 | 98, 146.9 |
| 90% 2780/ 10% FPD-400 | 28,500 | 25 | 139 (282) | 140 | 6.9 (1000) | 315 | −18 | 4.3 | 104.5, 146.2 |
| 80% 2780/ 20% FPD-400 | 70,000 | 17 | 144 (291) | 100 | (1700) | N.B. | −17 | 6.3 | 101.4 |
| 90% 2780/ 10% FPD-2300 | 37,000 | 23 | 154 (310) | 60 | (1900) | 142 | — | 2.2 | 152 |
| 85% 2780/ 15% FPD-2300 | 70,000 | 17 | 144 (291) | 120 | 11.7 (1700) | N.B. | −17 | 6.3 | 153 |
| 80% 278W 20% FPD-2300 | 145,000 | 15 | 158 (316) | 20 | 17.2 (2500) | N.B. | −16 | 8 | 153.3 |

N.B. = NO BREAK @ 311% ELONGATION

TABLE XVI

Physical and Mechanical Properties of High Melt Viscosity, 1-Butene/Propylene APAOs

| Polymer type (wt %) | MV (cPs) mPa × s | NP (dmm) | R & B SP ° C. (° F.) | OT (sec) | Tens. Mod. MPa (psi) | Tens. Strain @ Break (%) | $T_g$ (° C.) | H.F. (° C.) | mp (° C.) |
|---|---|---|---|---|---|---|---|---|---|
| 100% E21 LMW APAO | 3,750 | 7 | 90 (195) | 300 | 82.7 (12,000) | 20 | −28 | <2 | — |
| 95% E21/ 5% FPD-400 | 11,100 | 9 | 113 (235) | 240 | 83.4 (12,100) | 305 | −25 | 9 | 76 |
| 90% E21/ 10% FPD-400 | 15,500 | 9 | 123 (253) | 180 | 123 (17,900) | 271 | −25 | 27 | 72.2 |
| 85% E21/ 15% FPD-400 | 22,500 | 8 | 135 (275) | 150 | 84.1 (12,200) | N.B. | −25 | 13 | 70.9 |
| 80% E21/ 20% FPD-100 | 37,500 | 8 | 152 (305) | 60 | 93.1 (13,500) | N.B. | −25 | 18 | 70.9, 150.5 |
| 85% E21/ 15% FPD-2300 | 53,500 | 8 | 156 (313) | 60 | 110 (16,000) | N.B. | −25 | 21 | 71.5, 153.2 |
| 80% E21/ 20% FPD-2300 | 103,000 | 8 | 157 (315) | 40 | 138 (20,000) | N.B. | −23 | 23 | 71.4, 153.4 |

N.B. = NO BREAK @ 311% ELONGATION

EXAMPLE 135
LMW Ethylene/Propylene Blended with HMW Propylene

LMW APAO ethylene/propylene copolymer was blended with various amounts of low crystallinity, HMW APAO propylene (FPD designation) to form certain polymer blends of the present invention. REXTAC® 2585, is a LMW APAO of about 15 weight percent ethylene and 85 weight percent propylene copolymer. The REXTAC® 2585 LMIW APAO portion was blended with various amounts of HMW APAO polymers. The FPD-100, −400, and −2300 have heats of fusion as discussed above. The characteristics of these blends were examined and, although generally having lower tensile strain at break, they were generally found to be softer, have a higher NP, and have a longer open time than the corresponding amount of HMW APAO of Examples 109–119. These blends are useful in the composites and adhesive compositions of the invention.

Although preferred embodiments of the invention have been described in the foregoing description, it will be understood that the invention is not limited to the specific embodiments disclosed herein but is capable of numerous modifications by one of ordinary skill in the art. It will be understood that the materials used and the chemical details may be slightly different or modified from the descriptions herein without departing from the methods and compositions disclosed and taught by the present invention.

What is claimed is:

1. A method for preparing a fiber, thread or yarn, which comprises:
    preparing a polymer blend by combining a predominantly atactic flexible polyolefin polymer having a high weight average molecular weight of at least about 100,000, a heat of fusion of about 0.4 J/g, to 75 J/g and a melt flow rate of about 0.3 g/10 min. to 100 g/10 min. with an isotactic polypropylene polymer; and
    forming the polymer blend into a fiber, thread or yarn, wherein the flexible polymer is present in an amount sufficient to increase the elasticity of the fiber, thread or yarn to inhibit substantial breakage thereof.

2. The method of claim 1, wherein the flexible polyolefin polymer is prepared by polymerizing propylene with at least one second monomer comprising a $C_2$–$C_{20}$polyalphaolefin.

3. The method of claim 2, wherein the second monomer is selected to comprise ethylene.

4. The method of claim 2, wherein the second monomer is provided in the polymer blend in an amount from about 1.5 to 20 weight percent of the flexible polyolefin polymer weight.

5. The method of claim 3, wherein the second monomer is provided in the polymer blend in an amount from about 2 to 12 weight percent of the flexible polyolefin polymer weight.

6. The method of claim 1, wherein the isotactic polypropylene polymer is prepared by polymerizing propylene with at least one second monomer comprising a $C_2$–$C_{20}$polyalphaolefin.

7. The method of claim 6, wherein the second monomer is selected to comprise ethylene.

8. The method of claim 6, wherein the second monomer is provided in the polymer blend an amount from about 1.5 to 20 weight percent of the isotactic polypropylene polymer weight.

9. The method of claim 1, wherein at least one of the flexible polyolefin polymer or the isotactic polypropylene polymer is a propylene homopolymer.

10. The method of claim 1, wherein the flexible polyolefin polymer is provided in an amount from about 3 to 80 weight percent of the polymer blend weight.

11. The method of claim 1, wherein the polymer blend has an elongation at break of between about 300 to 669 percent.

12. The method of claim 1, wherein the fibers, threads or yarns are formed by spinbonding, meltblowing, meltspraying, or bond carding.

13. The method of claim 1, which further comprises configuring the fiber, thread or yarn into a non-woven product.

14. The method of claim 13, wherein the non-woven product is selected to comprise at least one of a web, a film, a foam, or a laminate structure.

15. The method of claim 13, wherein the fibers, threads or yarns are configured in a repeating pattern.

16. A fiber, thread or yarn comprising a polymer blend of:
    a predominantly atactic flexible polyolefin polymer having a high weight average molecular weight of at least about 100,000, a melt flow rate of between about 0.3 g/10 min. to 30 g/10 min. at 230° C., a polydispersity index of less than about 10, and a heat of fusion of about 0.4 J/g to 75 J/g; and
    an isotactic polypropylene polymer.

17. A non-woven product comprising the fiber, thread or yarn of claim 16.

18. The non-woven product of claim 17, wherein the fibers are arranged in a repeating pattern.

19. The fiber, thread or yarn of claim 16, wherein at least one of the flexible polyolefin polymer or the isotactic polypropylene polymer is a propylene homopolymer.

20. The fiber, thread or yarn of claim 16, wherein the flexible polyolefin polymer comprises propylene polymerized with at least one second monomer comprising a $C_2$–$C_{20}$ polyalphaolefin.

21. A composite article comprising: a fiber, thread, or yarn comprising a polymer blend comprising: a predominantly atactic flexible polyolefin polymer having a high weight average molecular weight of at least about 100,000, a melt flow rate of between about 0.3 g/10 min. to 30 g/10 min. at 230° C., a polydispersity index of less than about 10, an a heat of fusion of about 0.4 J/g to 75 J/g; and an isotactic polypropylene polymer; in contact with an adhesive polymer blend comprising:

a predominantly atactic flexible polyolefin polymer having a high weight average molecular weight of at least about 100,000 and a heat of fusion of about 0.4 J/g to 75 J/g; and an atactic polyolefin polymer having a low number average molecular weight of below about 25,000 and a heat of fusion of about 0.1 to 20 J/g, wherein the high molecular weight polymer and low molecular weight polymer are sufficiently miscible to impart a single glass transition temperature and an open time to the polymer blend, and the low molecular weight polymer is present in an amount sufficient to impart a melt viscosity of greater than about 8,000 cPs at room temperature and a crystallinity below about 28 J/g to the adhesive polymer blend.

22. A composite article comprising:

fibers, threads, or yarn arranged in a non-woven pattern; and an adhesive component comprising a predominantly atactic flexible polyolefn polymer having a high weight average molecular weight of at least about 100,000 and a heat of fusion of about 0.4 J/g to 75 J/g, and an atactic polyolefin polymer having a low number average molecular weight of below about 25,000 and a heat of fusion of about 0.1 J/g to 20 J/g, wherein the high molecular weight polymer and low molecular weight polymer are sufficiently miscible to impart a single glass transition temperature and an open time to the polymer blend, and the low molecular weight polymer is present in an amount sufficient to impart a melt viscosity of greater than about 8,000 cPs at room temperature and a crystallinity below about 28 J/g to the polymer blend.

23. A polymer blend comprising:

a predominantly atactic flexible polyolefin polymer including propylene copolymerized with ethylene present in an amount from about 1 to 40 weight percent of the polymer, wherein the polymer has a high weight average molecular weight of at least about 100,000 and a heat of fusion of about 0.4 J/g to 75 J/g; and an atactic polyolefin polymer having a low number average molecular weight of below about 25,000 and a heat of fusion of about 0.1 to 20 J/g, wherein the high molecular weight polymer and low molecular weight polymer are sufficiently miscible to impart a single glass transition temperature and an open time to the polymer blend, and the low molecular weight polymer is present in an amount sufficient to impart a melt viscosity of greater than about 8,000 cPs at room temperature and a crystallinity below about 28 J/g to the polymer blend.

24. The polymer blend of claim 23, wherein the ethylene comprises from about 1.5 to 20 weight percent of the flexible polymer.

25. The polymer blend of claim 24, wherein the ethylene comprises from about 2 to 12 weight percent of the flexible polymer.

26. The polymer blend of claim 23, wherein the atactic polyolefin polymer comprises propylene polymerized with at least one second monomer comprising a $C_2$–$C_{20}$ polyalphaolefin.

27. The polymer blend of claim 26, wherein the second monomer comprises from about 2 to 70 weight percent of the atactic polyolefin polymer.

28. An adhesive comprising the polymer blend of claim 23.

29. The method of claim 1, wherein the atactic flexible polyolefin polymer has a heat of fusion from about 25 J/g to 75 J/g.

* * * * *

UNITED STATES PATENT AND TRADEMARK OFFICE
CERTIFICATE OF CORRECTION

PATENT NO. : 6,080,818

DATED : June 27, 2000

INVENTOR(S) : Mahendra T. THAKKER; Jesus F. GALINDO; Dharmendra JANI

It is certified that error appears in the above-identified patent and that said Letters Patent is hereby corrected as shown below:

Col. 39, line 6, replace "predominantlv" with --predominantly--; and
line 10, delete "an".

Signed and Sealed this

Third Day of April, 2001

Attest:

NICHOLAS P. GODICI

Attesting Officer

Acting Director of the United States Patent and Trademark Office